(12) United States Patent
Peirson et al.

(10) Patent No.: US 7,698,212 B1
(45) Date of Patent: Apr. 13, 2010

(54) ONLINE SETTLEMENT STATEMENT AND FUNDING CONTROL SYSTEM AND METHOD

(76) Inventors: Chris A. Peirson, 1235 Lausanne Ave., Dallas, TX (US) 75208; William H. Peirson, 1235 Lausanne Ave., Dallas, TX (US) 75208; Michelle R. Smith, 1623 Eastus Dr., Dallas, TX (US) 75208; Christopher L. Bryant, 1409 Glenwick Dr., Rockwall, TX (US) 75032; Kyle L. Trafton, 9727 Carnegie Dr., Dallas, TX (US) 75228; James F. Dunkerley, 5507 Bryan St., Dallas, TX (US) 75206

( * ) Notice: Subject to any disclaimer, the term of this patent is extended or adjusted under 35 U.S.C. 154(b) by 1390 days.

(21) Appl. No.: 10/719,364

(22) Filed: Nov. 21, 2003

(51) Int. Cl.
*G06Q 40/00* (2006.01)
(52) U.S. Cl. .................. 705/38; 705/39; 705/42
(58) Field of Classification Search .............. 705/38
See application file for complete search history.

(56) References Cited

U.S. PATENT DOCUMENTS

| | | | |
|---|---|---|---|
| 6,711,554 B1 * | 3/2004 | Salzmann et al. ............. 705/64 |
| 7,085,735 B1 * | 8/2006 | Hall et al. ..................... 705/26 |
| 2001/0029482 A1 * | 10/2001 | Tealdi et al. .................. 705/38 |
| 2001/0047326 A1 * | 11/2001 | Broadbent et al. ............ 705/38 |
| 2003/0036994 A1 * | 2/2003 | Witzig et al. .................. 705/38 |

* cited by examiner

*Primary Examiner*—James P Trammell
*Assistant Examiner*—Scott S Trotter
(74) *Attorney, Agent, or Firm*—Michael P. Adams; Winstead P.C.

(57) ABSTRACT

The present invention integrates data from multiple outside sources for the purpose of managing the closing, funding, and audit of a real property transaction using a secure, computer network, such as an internet-based network, and graphic user interface(s), thereby allowing permitted users to import, update, verify, view, and control transaction information. Permitted users can electronically communicate and view the transaction data during the process of the real property transaction. An Internet-based computer system may execute one or more computer program products for providing secured data input, data input screens, and data import capability, and sequencing an approval of data input by the permitted users.

23 Claims, 62 Drawing Sheets

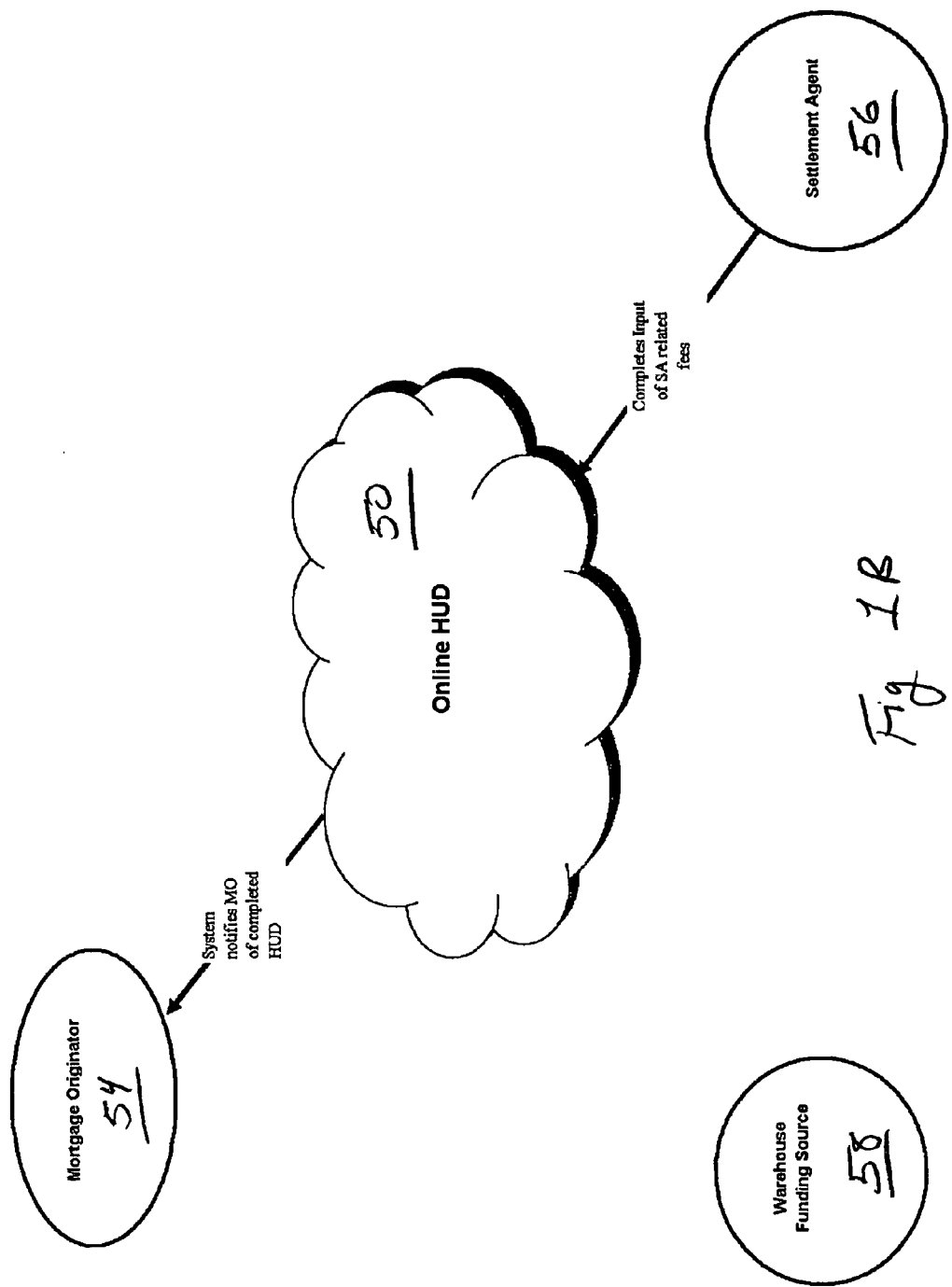

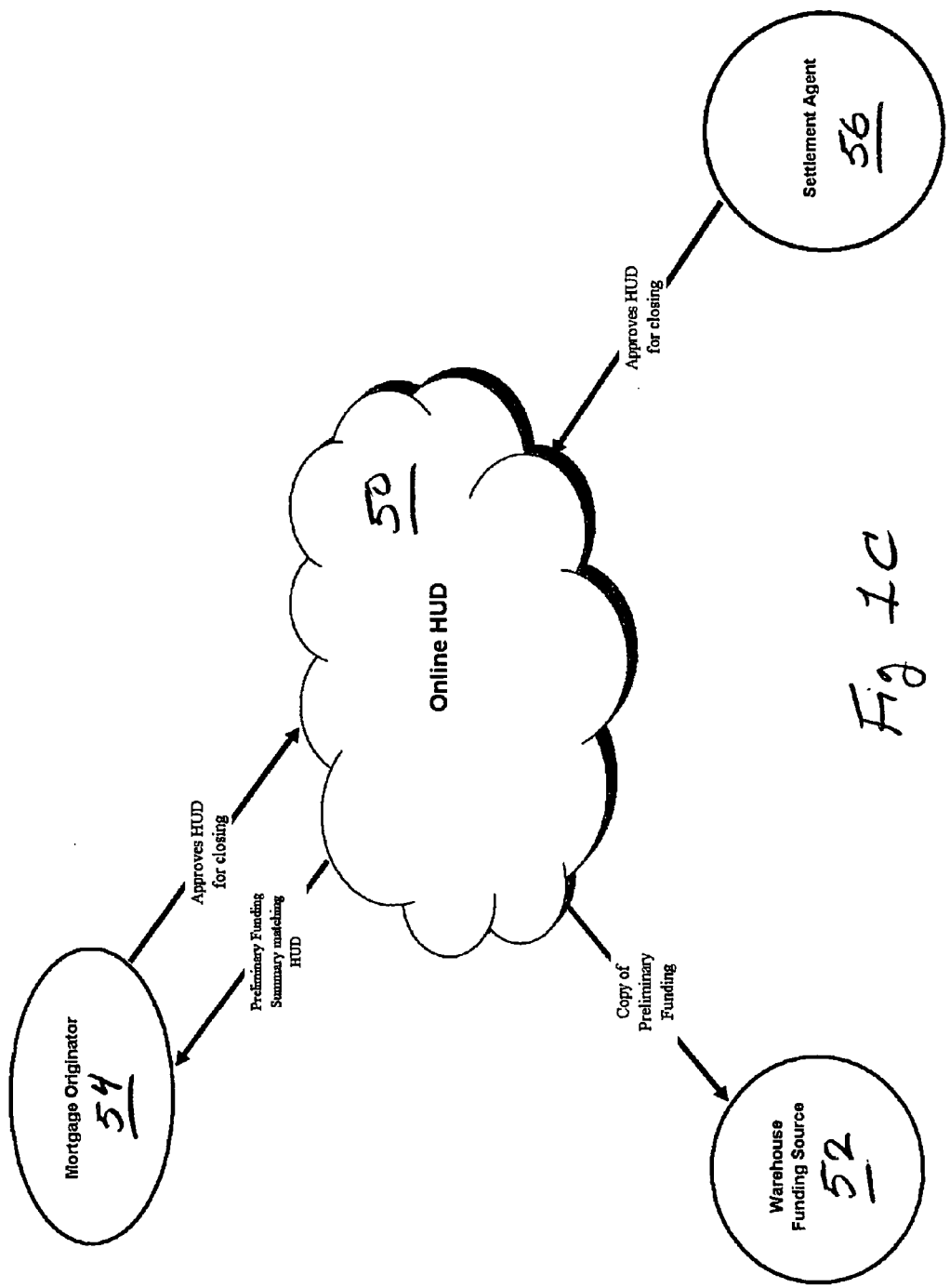

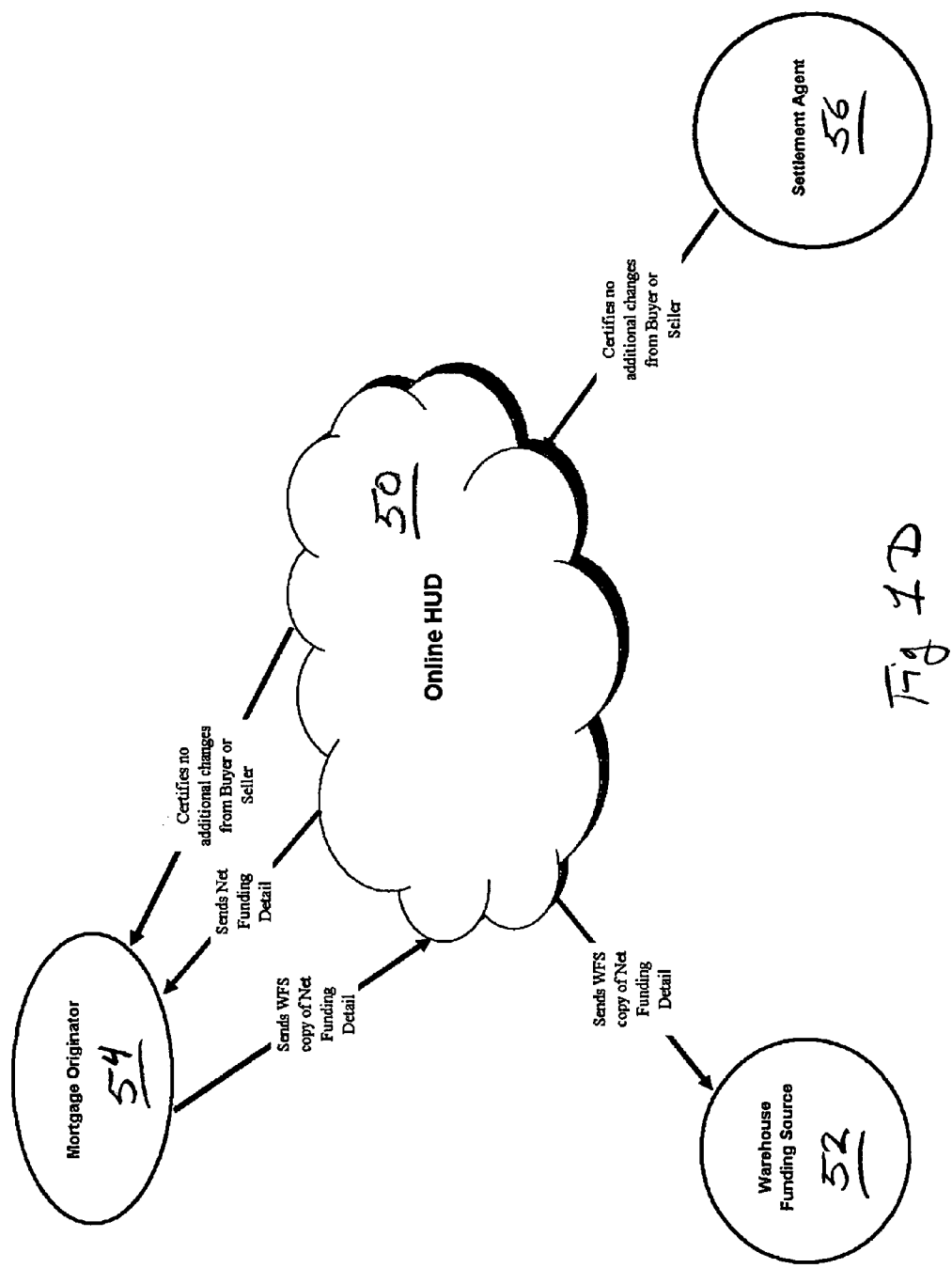

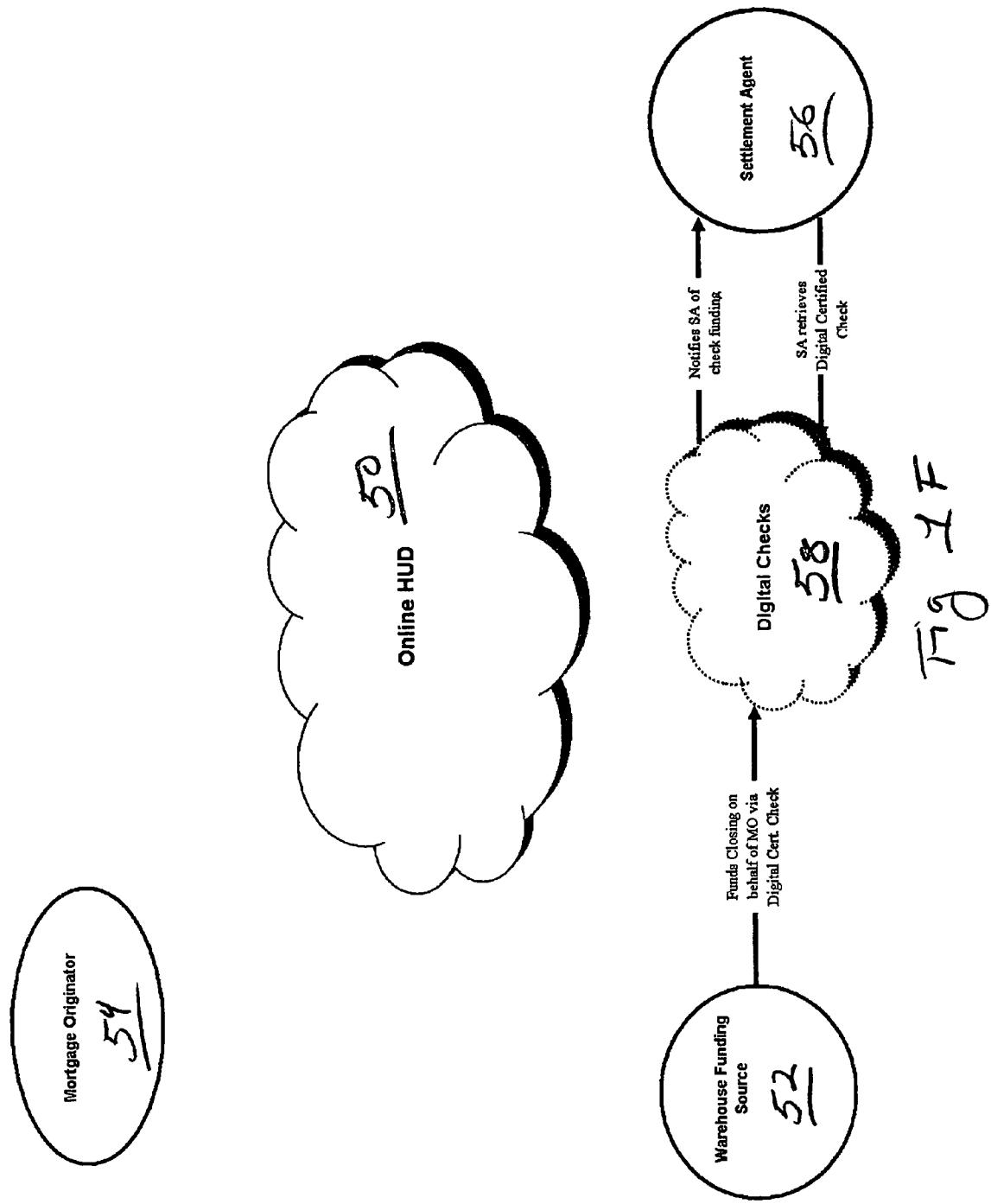

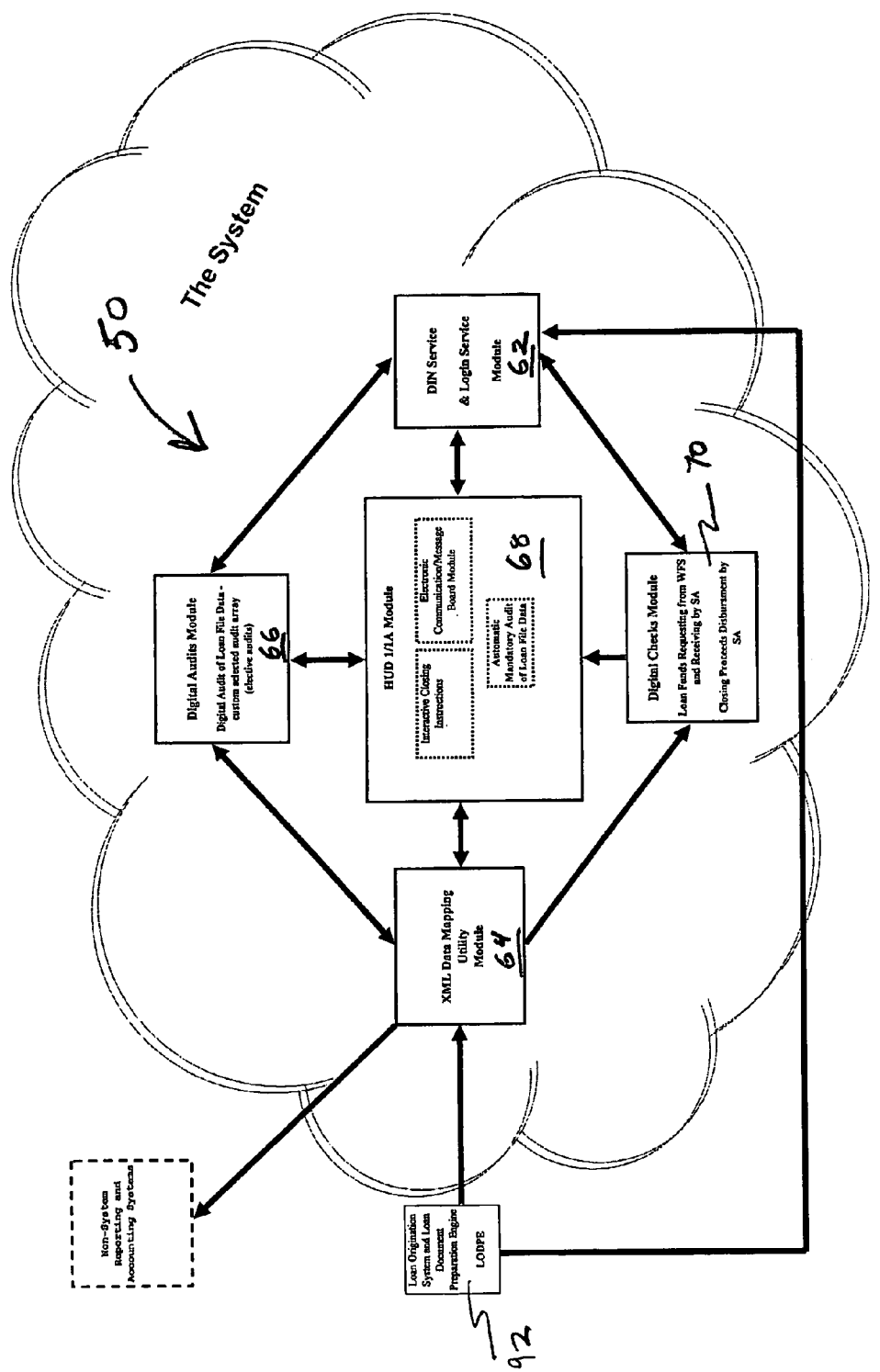

FIG. 6B

FIG. 6C(1)

| Settlement Agent Information | |
|---|---|
| Payoff Loan #: [     ] | Lock Expiration Date: [     ] |
| Loan Amount $: [     ] | Residence Type: [Primary ▼] |
| PMI or MIP Needed: [No ▼] | Needs App Package: [No ▼] |
| Loan Counselor's Name: [     ] | |
| Loan Processor's Name: [     ] | |
| Title Clearance Issues: | ☐ SUB  ☐ PUD  ☐ Judgement<br>☐ Release  ☐ Quit-Claim  ☐ Second Payoff<br>☐ P&P Ordered Survey |
| Name Affidavits: [     ]<br>[     ] | |
| Special Instructions: [     ] | |

[Submit]

<< Back To Reports [ Print This Page ]

| PRMI Loan Information Sheet ||
|---|---|
| Customer: | Loan #: 123456789 |
| Payoff Loan #: 221111 | Expires: 02-28-03 |
| | Counselor: Suzie Loans |
| | Processor: Chris Processor |
| Title Clearance Issues:<br>☐ SUB ☐ PUD ☐ Judgement<br>☐ Release ☐ Quit-Claim ☐ Second Payoff<br>☒ P&P Ordered Survey ||
| ☐ Needs Application Package ☐ PMI/MIP Needed ||
| Required Documents and Riders for the state of Texas:<br><br>▫ TX Renewal & Extension Exhibit (Homestead Property only)<br>▫ TX Renewal & Extension Exhibit (Homestead Property only)<br>▫ _____<br>▫ _____<br>▫ _____ ||
| Name Affidavits: ||
| Closing Date: 03-01-03 | Loan Amount: 190000 |
| Borrower Information:<br>    Sally Borrower<br>    1327 North Edgefield Ave.<br>    Dallas, TX 75208<br>    SSN: 230199954<br>    Home Phone: 214-222-2222    Work Phone: 972-888-8888<br>    Additional Phone ||
| Property Address:<br>    1327 North Edgefield Ave.<br>    Dallas, TX 75208<br>    Country: ||
| ☒ Primary      ☐ Secondary      ☐ Investment ||
| Special Instructions ||

FIG. 8

Disbursement Ledger

Transaction Status
Lender: Approved
Title Agent: Approved
[change status]
Messages: 0 Unread

- Home
- Disclaimer
- Contact Us
- Help
- My Transactions
- General Information
- Borrower/Seller Info.
- Payees
- 700 - 1400 Series
- 100 - 600 Series
- View HUD-1
- Reports
- Message Board
- Approved Document

| Net Funding Reconciliation | | |
|---|---|---|
| LENDER | | LOAN AMOUNT |
| New Investors Inc. | | $190,000.00 |
| LINE ITEM/DESCRIPTION | | NET AMOUNT |
| 204. | Lender Paid closing Costs | ($371.88) |
| 205. | Application Fee Credit | ($200.00) |
| 206. | ESCROW BALANCE | (687.80) |
| 801. | Loan Origination Fee | $700.80 |
| 802. | Loan Discount | $311.20 |
| 1001. | Hazard Insurance | $294.00 |
| 1002. | Mortgage Insurance | $420.00 |
| 1004. | County property taxes | $60.00 |
| NET FUNDING TOTAL | | $525.52 |
| NET FUNDING AMOUNT | | $189,474.48 |

Fund Remittance

Remit Funds To: Funding Coordinator
Street Address: 1234 Funding Blvd.
City: Rockwall   State: Texas   Zip: 75032
Fund By: Wire Transfer *

*If Fund Method is Wire Transfer please complete the following:

Wire Company Name: Wire Company Name
Street Address: 1243 Wire St.
City: Dallas   State: Texas   Zip: 75244
Contact Name: Wire Contact
Loan Number: 123456789
File Number: 12345
Bank ABA #: Bank ABA
Bank Name: Bank Name
City: Lewisville   State: Texas
Credit Account #: Credit Account #
Reference: Reference
Notify(email/phone#): notify@email.net

Email This Page

Email To*: [ ] Send

*delimit multiple address with a semicolon, such as lender@lender.com; seller@seller.net;title@title.com

| A. Settlement Statement | U.S Department of Housing and Urban Development | OMB Approval No. 2502-0265 | | |
|---|---|---|---|---|
| B. Type of Loan | | | | |
| 1. ☐ FHA  2. ☐ RHS (FmHA)  3. ☐ Conv. Unins  4. ☐ VA  5. ☒ Conv. Ins. | 6. File Number: 12345 | 7. Loan Number: 123456789 | 8. Mortgage Insurance Case Number: | |
| C. Note: | This form is furnished to give you a statement of actual settlement costs. Amounts paid to and by the settlement agent are shown. Items marked "(p.o.c.)" were paid outside of the closing; they are shown here for informational purposes and are not included in the totals. | | | |
| D. Name & Address of Borrower: Sally Borrower 1327 North Edgefield Ave. Dallas, TX 75208 | E. Name & Address of Seller: | F: Name & Address of Lender: New Investors Inc. 123 Best Way Dallas, TX 75244 | | |
| G. Property Location: 1327 North Edgefield Ave. Dallas, TX 75208 | H. Settlement Agent: ABC Title Company | I. Settlement Date: 03-01-03 | | |
| | Place of Settlement: 1327 North Edgefield Ave. Dallas, TX 75208 | Funding Date: 03-05-03 | | |
| J. Summary of Borrower's Transaction | | K. Summary of Seller's Transaction | | |
| 100. Gross Amount Due From Borrower | | 400. Gross Amount Due To Seller | | |
| 101. Contract sales price | $225,000.00 | 401. Contract sales price | | |
| 102. Personal property | | 402. Personal property | | |
| 103. Settlement charges to borrower (L 1400) | $4,357.20 | 403. | | |
| 104. | | 404. | | |
| 105. | | 405. | | |
| Adjustments for items paid by seller in advance | | Adjustments for items paid by seller in advance | | |
| 106. City/town taxes | $350.00 | 406. City/town taxes | | |
| 107. County taxes | | 407. County taxes | | |
| 108. Assessments | | 408. | | |
| 109. | | 409. | | |
| 110. | | 410. | | |
| 111. | | 411. | | |
| 112. | | 412. | | |

FIG. 12A(1)

| 120. Gross Amount Due From Borrower | $229,707.20 | 420. Gross Amount Due To Seller | $.00 |
|---|---|---|---|
| 200. Amounts Paid By Or In Behalf Of Borrower | | 500. Reductions In Amount Due To Seller | |
| 201. Deposit or earnest money | | 501. Excess deposit | |
| 202. Principal amount of new loan(s) 502. | $190,000.00 | 502. Settlement charges to seller (L 1400) | |
| 203. Existing loan(s) taken subject to 503. | | 503. Existing loan(s) taken subject to | |
| 204. Lender Paid closing Costs | $371.88 | 504. Payoff of first mortgage loan | |
| 205. Application Fee Credit | $200.00 | 505. Payoff of second mortgage loan | |
| 206. ESCROW BALANCE | $687.80 | 506. | |
| 207. | | 507. | |
| 208. | | 508. | |
| 209. | | 509. | |
| Adjustments for items unpaid by seller | | Adjustments for items unpaid by seller | |
| 210. City/town taxes | $185.00 | 510. City/town taxes | |
| 211. County taxes | | 511. County taxes | |
| 212. Assessments | | 512. Assessments | |
| 213. | | 513. | |
| 214. | | 514. | |
| 215. | | 515. | |
| 216. | | 516. | |
| 217. | | 517. | |
| 218. | | 518. | |
| 219. | | 519. | |
| 220. Total Paid By/For Borrower | $191,444.68 | 520. Total Reduction Amount Due Seller | $.00 |
| 300. Cash At Settlement From/To Borrower | | 600. Cash At Settlement To/From Seller | |
| 301. Gross amount due from borrower (L 120) | $229,707.20 | 601. Gross amount due to seller (L 420) | |
| 302. Less amounts paid by/for borrower (L 220) | $191,444.68 | 602. Less reductions in amt. due seller (L 520) | |
| 303. Cash [ X ] From [ ] To Borrower | $38,262.52 | 603. Cash [ ] From [ ] To Seller | |

FIG. 12A(2)

| | | | |
|---|---|---|---|
| L. Settlement [SETTLEMENT] Charges | | | |
| 700. Total Sales/Broker's Commission based on price $ 150      %= 0 | | Paid From Borrower's Funds at Settlement | Paid From Seller's Funds at Settlement |
| Division of Commission (line 700) as follows: | | | |
| 701. $.00 | to | | |
| 702. $.00 | to | | |
| 703. Commission paid at Settlement | $1,500.00 (B)           (poc) | $1,500.00 | |
| 704. | | | |
| 800. Items Payable In Connection With Loan | | | |
| 801. Loan Origination Fee | 1% to New Lender, Inc. | $700.00 | |
| 801.1 fee | 1% to New Lender, Inc. | $100.00 | |
| 802. Loan Discount | to New Lender, Inc. | $311.20 | |
| 803. Appraisal Fee | to New Lender, Inc.    $.00 (B)   (poc) | $35.00 | |
| 804. Credit Report | to New Lender, Inc. | $30.00 | |
| 805. Lender's Inspection Fee | to New Lender, Inc. | $50.00 | |
| 806. Mortgage Insurance Application Fee | | | |
| 807. Assumption Fee | | | |
| 808 | | | |
| 809 | | | |
| 810 | | | |
| 811. My Fee | to P & P Services | $100.00 | |
| 900. Items Required By Lender To Be Paid In Advance | | | |
| 901. Interest from 0 to | | | |
| 902. Mortgage Insurance Premium for | | | |
| 903. Hazard Insurance Premium for | | | |
| 904 | | | |
| 905 | | | |
| 1000. Reserves Deposited With Lender | | | |
| 1001. Hazard Insurance | 12 months@ $24.50 per month | $294.00 | |
| 1002. Mortgage Insurance | 12 months@ $35.00 per month | $420.00 | |
| 1003. City property taxes | 6 months@ $12.00 per month | $72.00 | |
| 1004. County property taxes | 6 months@ $10.00 per month | $60.00 | |
| 1005. Annual assessments | 0 months@ $.00 per month | | |

FIG. 12B(1)

| | | | |
|---|---|---|---|
| 1006 | | | |
| 1007 | | | |
| 1008 | | | |
| 1100. | Title Charges | | |
| 1101. | Settlement or closing fee          to New Lender, Inc. | $500.00 | |
| 1102. | Abstract or title search | | |
| 1103. | Title examination | | |
| 1104. | Title insurance binder | | |
| 1105. | Document preparation | | |
| 1106. | Notary fees                         to New Lender, Inc. | $35.00 | |
| 1107. | Attorneys fees | | |
| 1108. | Title insurance                     to New Lender, Inc. | $150.00 | |
| 1109. | Lender's coverage | ///// | ///// |
| 1110. | Owner's coverage | ///// | ///// |
| 1111 | | | |
| 1112 | | | |
| 1113 | | | |
| 1114 | | | |
| 1200. | Government Recording and Transfer Charges | | |
| 1201. | Recording fees Deed $.00 | | |
| 1202. | City/county tax/stamps: Deed $.00 | | |
| 1203. | State tax/stamps: Deed $.00 | | |
| 1204 | | | |
| 1205 | | | |
| 1300. | Additional Settlement Charges | | |
| 1301. | Survey | | |
| 1302. | Pest inspection | | |
| 1303 | | | |
| 1304 | | | |
| 1305 | | | |
| 1400. | Total Settlement Charges (enter on lines 103, Section J and 502, Section K) | $4,357.20 | $.00 |

FIG. 12B(2)

ONLINE SETTLEMENT STATEMENT AND FUNDING CONTROL SYSTEM AND METHOD

BACKGROUND OF THE INVENTION

1. Field of the Invention

The present invention relates to an interne web based online System and Method used in closing real estate transactions.

2. Description of the Related Art

All charges paid by a buyer, seller, or borrower in connection with a real property transaction must be computed and displayed on the Department of Housing and Urban Development's HUD-1 form or HUD 1A form (hereinafter "HUD-1" or "HUD1/1A") settlement statement. See, e.g., FIG. 12. Every transfer or financing transaction from which a HUD-1 arises, involves the following steps:

(i) Transfer/disbursement of funds pursuant to HUD-1;

(ii) Recordation of executed transfer and/or financing documents resulting from transaction; and (iii) Disbursement of executed documents after transaction completion.

The HUD-1's primary purpose is to provide a consistent format in which the charges to both buyers and sellers are calculated and disclosed. The HUD-1 has been developed through government regulation as a mandatory form document to be used on consumer real property transactions involving charges to borrowers, buyer or sellers. The only current exception to mandatory use of the HUD-1 for a consumer real property transaction is in connection with a Home Equity Line of Credit (HELOC) financing transaction. However, most Settlement Agents utilize the HUD-1/1A in most transactions since it is most compatible with their internal protocols and familiar to a wide variety of third parties. The regulations relating to the HUD-1 are intended to denominate specific line items for the common fees and charges. These HUD-1 regulations have been frequently misinterpreted, misread or otherwise not followed by preparers. The consequence of failing to follow the regulatory requirements of preparing a HUD-1 can be severe. The consequences may even create or concentrate unintentional liability on the preparer, while relieving liability of the other parties to the transaction.

Additionally, the closing of a financing transaction which violates state or federal high cost (or "predatory lending") regulations may create unintentional liabilities, and may even impact the salability of the consumer real property loan in the secondary market. The salability of any given consumer real property loan in the secondary market is significant in that it impacts the value of the loan as an asset of the Mortgage Originator.

Further complicating this situation is the requirement that multiple parties coordinate at multiple intervals in order to consummate a real property transaction. For example, a Mortgage Originator, Settlement Agent (the preparer of the HUD-1/1A), and funding or lending source may participate in the process. This may create a difficult communication environment as well as complicate the audit requirements relating to any financing involved in the transaction. In the absence of a comprehensive system and method for coordination and consummation, each interval of the process presents an opportunity for error and/or fraud. Any such comprehensive system and method must be capable of satisfying not only the Settlement Agent requirements, but the consumer (buyer and seller), lender, and vendor requirements, as well as the legal requirements.

Current regulations require that all settlements or financial transactions involving consumer real property include the utilization of a HUD-1 promulgated form. Most Settlement Agents currently use some form of computer generated HUD-1 prepared by a system proprietary to their title company, or one that is sold by a system vendor serving the title industry. A typical HUD-1 preparation system uses a template format allowing the Settlement Agent to enter numbers in what they interpret to be the appropriate locations. Some systems permit the Settlement Agent a limited import of data from their existing system(s) into the HUD-1 form, such as property legal descriptions and buyer/seller name. Some systems also permit the Settlement Agent to send data from the HUD-1 entry fields to a check-writing program to facilitate the issuance of closing proceeds and disbursement via paper checks.

The prior art systems do not permit, however, the lending source to have any direct input control of the numbers used in the HUD-1, nor do they require approval of the lending source prior to execution of the HUD-1 by either buyer (borrower) or seller. Essentially, the use of the HUD-1 forms as mandated by existing regulation is dependant upon the interpretation of the Settlement Agents without regard to: (i) audit of its content for legal compliance before execution; or (ii) a lending source being asked to provide funding of the transaction only after the process is closed. This lack of checks and balances can result in multiple iterations of the HUD-1 being executed in connection with a transaction, which in turn gives rise to confusion as to which HUD-1 is the final version. Further, since prior art systems do not have sophisticated front-end controls for the Mortgage Originators or Warehouse Funding Source (warehouse bank), holding Settlement Agents accountable for failure to follow closing instructions is difficult since, in most cases, the loan has already been funded.

Accordingly, a need exists for an interne web-based mechanism by which coordination of the various parties, information, documents and funds involved in a real property transaction can be managed, audited, tracked, and disbursed, and reports can be generated for the various participants to use as permanent records, and to provide loan-level accounting for mandated executive certifications.

SUMMARY OF THE INVENTION

The System and Method of the present invention integrates data from multiple outside sources for the purpose of managing the closing, funding, and audit of a real property transaction using a secure, electronic computer network, such as an internet-based network, and graphic user interface(s), thereby allowing permitted users to import, update, verify, view, and control transaction information. The permitted users typically would include, but may not be limited to:

(1) Mortgage Originator (2) Settlement Agent (3) Warehouse Funding Source

The System and Method allows these permitted users to electronically communicate and view the transaction data during the process of creating the final HUD-1 for the real property transaction.

The System and Method generally may employ an Internet-based computer system which executes one or more computer program products for providing secured data input, data input screens, and data import capability, and sequencing an approval of data input by the Mortgage Originator and Settlement Agent.

More particularly, the System and Method of one embodiment of the present invention can manage the closing of a real property transaction using a networked computer system, wherein the networked computer system includes one or more client computers, a server computer, and a network which interfaces the one or more client computers and the server computer. In the System and Method, the Mortgage Originator can access, through a client computer, one or more computer program products stored on the server computer, wherein the one or more computer program products are used to manage the closing of a real property transaction in accordance with one embodiment of the present invention. Through the one or more computer program products, the Mortgage Originator can enter a first group of data into a settlement statement used in a real property transaction. Then, the Settlement Agent can access the one or more computer program products, through their client computer, and enter a second group of data into the settlement statement. The Mortgage Originator can then view and authorize the second group of data that was entered by the Settlement Agent. A real property transaction will be presented for funding and the settlement statement will be presented for signature by the borrower/buyer and seller only if the Mortgage Originator authorizes the second group of data entered into the settlement statement.

The Mortgage Originator may enter its first group of data into the settlement statement manually or through importing capability.

The System and Method include the ability to notify the Mortgage Originator and Settlement Agent of the progress in the real property transaction and the settlement statement. The System and Method further comprise the ability to audit data that was entered by the Mortgage Originator and Settlement Agent.

A Warehouse Funding Source may also access the one or more computer program products from its client computer. In accordance with one embodiment of the present invention, the Warehouse Funding Source will fund the real property transaction only if it receives authorization from the Mortgage Originator through the System.

In one embodiment, the System and Method provide for the capability of the Warehouse Funding Source to electronically fund the real property transaction. The electronic funding capability may include a "send" computer program product which resides on the Warehouse Funding Source's client computer and a "receive" computer program product which resides on the Settlement Agent's client computer. The Warehouse Funding Source also has the capability of placing conditions on the Settlement Agent that need to be satisfied before the Warehouse Funding Source will fund the transaction.

In one embodiment, the System and Method further provide the capability of auditing the settlement statement both prior to and after funding. This System and Method also provide for the capability of the Mortgage Originator and Settlement Agent to dynamically grow the data that they enter into the settlement statement. Finally, in one embodiment, the System and Method provide the Warehouse Funding Source and Settlement Agent with automatic notification of a change in the status of the funding, including notification that funding has been sent or received.

BRIEF DESCRIPTION OF THE DRAWINGS

The present invention may be better understood, and its numerous objects, features and advantages made apparent to those skilled in the art by referencing the accompanying drawings, which illustrate, by way of example, a preferred embodiment of the invention. The use of the same reference number throughout the several figures designates a like or similar element.

FIGS. 1A-1F are block diagrams illustrating a computer network for performing the processes of an embodiment of the present invention;

FIG. 2 is a block diagram that illustrates the modules of the System in an embodiment of the present invention;

FIGS. 6A-6Z, FIGS. 7-9, FIGS. 10A-10C, and FIG. 11 are examples of screen displays that can be displayed to a user, through a graphical user interface, in an embodiment of the present invention;

FIG. 12 is an example of a settlement statement; and

DETAILED DESCRIPTION

I. Overview

Figure 1A:
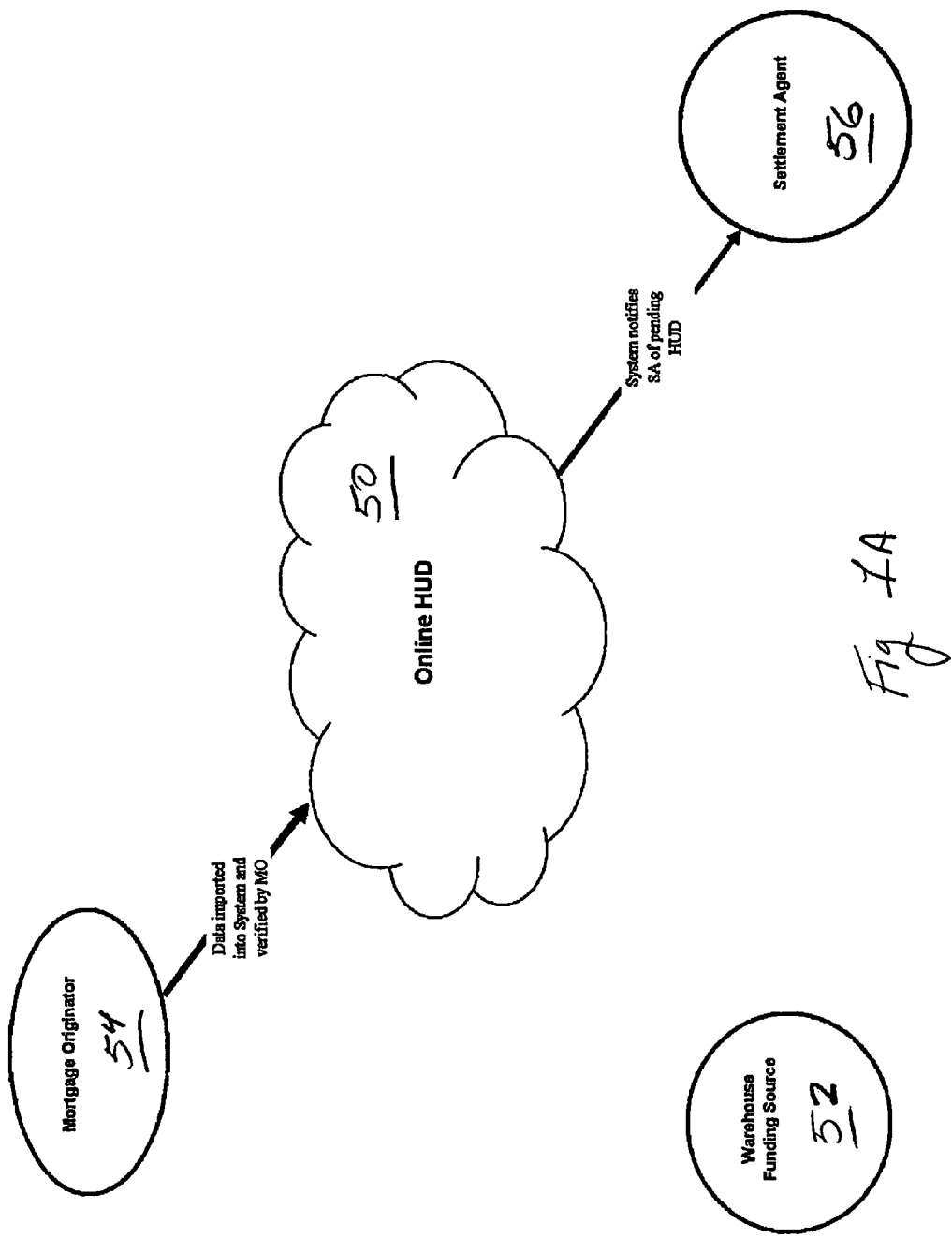
Figure 1E:
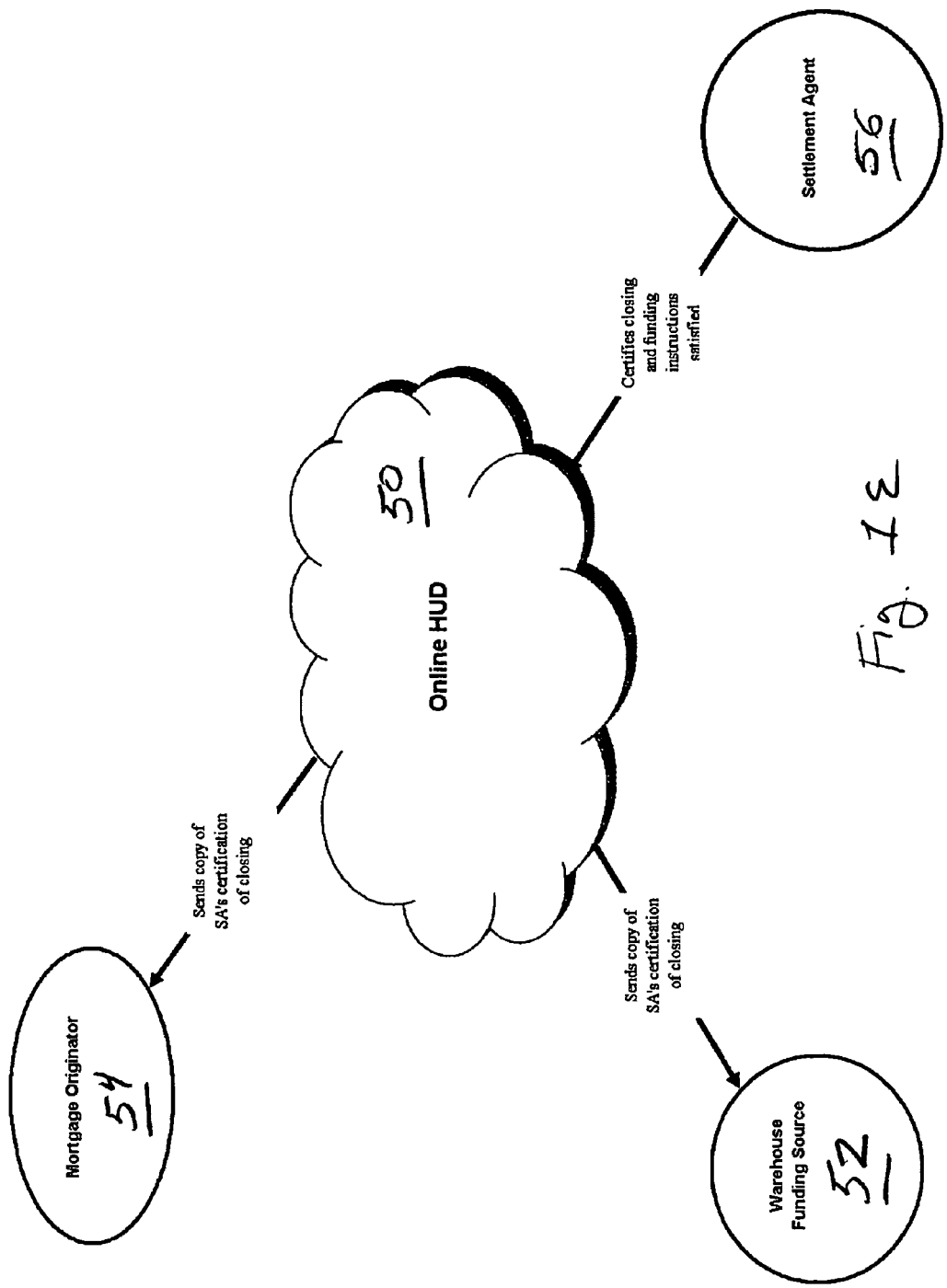

The System and Method of the present invention integrates data from multiple outside sources for the purpose of managing the closing, funding, and audit of a real property transaction using a secure, electronic computer network, such as an internet-based network, and graphic user interface(s), thereby allowing permitted users to import, update, verify, view, and control transaction information. The permitted users typically would include, but may not be limited to:

(1) Mortgage Originator
(2) Settlement Agent
(3) Warehouse Funding Source

The System and Method allows these permitted users to electronically communicate and view the transaction data during the process of the real property transaction. The System and Method of the present invention is most applicable to consumer real property transactions but can also be used for commercial transactions, especially commercial transactions in which a HUD-1/1A is used.

Further, the System and Method also: helps ensure compliance with government regulations concerning the placement of certain fees and charges on the HUD-1; permits the insertion of lender-related fees by the Mortgage Originator only; permits the insertion of the title/settlement related fees by the Settlement Agent only; requires both Settlement Agent and Mortgage Lender to approve the HUD-1 prior to submission to buyer (borrower) and seller for signature; and automates the requesting of loan funds from the Warehouse Funding Source, based on the approved HUD-1.

With respect to Settlement Agents, the present invention provides them the ability to: receive good funds from the Warehouse Funding Source automatically via certified check; disburse closing proceeds electronically or via paper check to all parties; and automatically compare funds requested, funds received, and funds disbursed, and stop the process at any time such data does not match, thereby preventing incorrect or accidental fundings.

With respect to Mortgage Originators, the present invention provides them the ability to: directly control fees and charges on the buyer's or borrower's HUD-1; control when funds are requested and the amounts delivered; eliminate incorrect or accidental funding of loans using warehouse funds; automatically correlate (audit) reports of funding versus warehouse loan reports via custom report writer capability; and automatically compare funds requested, funds received, and funds disbursed, and stop the process at any time such data does not match, thereby preventing incorrect or accidental fundings.

With respect to Warehouse Funding Sources, the present invention provides them the ability to: receive written confirmation of satisfaction of all closing instructions by the Settlement Agent; fund a warehouse loan virtually automatically via certified check versus wire funds; place conditions on funding check certification that enhance the ability to reject a funding request if it is determined that conditions were not satisfied by the Settlement Agent (i.e., prevention of funding unsalable loans); have loan files audited for salability issues prior to funding; automatically correlate (audit) report of funding versus warehouse loan reports, via custom report writer capability; confirm that both Settlement Agent and Mortgage Originator have approved the HUD-1 prior to funding of warehouse loan funds; and 24/7 funding capability via electronic certified checks.

To accomplish the above features and functions, the System and Method generally may employ, as generally illustrated in FIGS. 1A-1F (discussed in more detail below), an Internet based computer system which executes one or more computer program products 50 for providing secured data input, data input screens and data import capability, and sequencing and approval of data input by the Mortgage Originator 54 and Settlement Agent 56.

The System and Method also provides for: automatic audit of imported and input loan data for salability and compliance matters; embedded loan funding request with checks and balances to prevent accidental or incorrect mortgage loan fundings; built-in electronic delivery and confirmation of certified funds to the Settlement Agent 56; built-in electronic (or paper) check generating capability by the Settlement Agent 56; audit data and funding document storage in a single repository; and 24/7 loan funding request and funds receipt capability.

The System 50 is particularly unique in view of the prior art in that it focuses not only on the HUD-1 itself, but also on the closing funds (loan). The System and Method defines: who controls the input of data into the HUD-1, and when; how accidental or incorrect loan funding is prevented; how closing proceeds are FUNDED TO the Settlement Agent 56 and audited; how the HUD-1 can be audited by the Settlement Agent 56 and outside parties after the closing; how closing proceeds can be DISBURSED by the Settlement Agent 56 and audited; how the loan file can be automatically audited pre- (and post) closing for salability; and how data can be captured and retained for future reporting. The System 50 provides for an immediate penalty mechanism, e.g., dishonorment of a certified check, to be imposed against the Settlement Agent 56 if a party's closing instructions are not followed.

Prior art systems have focused on facilitating the Settlement Agent's ability to disburse funds after receipt of traditional wire funds. Such prior art systems have not provided the Warehouse Funding Source with much, if any, control or audit capability of the transaction or funding.

II. System Modules

As illustrated in FIG. 2, the System 50 is generally comprised of Five Modules (the Modules) defined herein and referred to as:

1. Digital Identification Number (DIN) Service and Login Service Module (DINLOG) 62;
2. XML Data Mapping Utility Module (XMLU) 64;
3. Digital Audits Module (DAM) 66;
4. HUD 1/1A Module (H1M) 68; and
5. Digital Checks Module (DCM) 70.

The Modules interact at various times for various functions during the process of creating a HUD 1/1A settlement statement, requesting and receiving lender funds, and disbursement of closing proceeds. Generally, the modules function as described below.

1. DINLOG

The DINLOG 62 serves to authenticate every user who logs into the System 50 regardless of the module that is used. The DINLOG 62 accomplishes the authentication by prompting the first-time user to create a user name and password at the time of logging into the System 50. The DINLOG permits the first time user to select a functional position (Mortgage Originator, Settlement Agent, or Warehouse Funding Source) at first log in, but requires specific authorization from a system administrator in order to change functional position thereafter. The DINLOG then requires the user to input a user name, password at each login. The authentication results then permit appropriate read/write, read-only, or no access to the individual Modules. The login authentication is performed each time a user logs into the System 50. The DINLOG 62 also is the module that assigns a System-Unique identifying number (a/k/a DIN) to the "packet" or "cluster" of data that is first imported or input by the Mortgage Originator 54. The DIN is maintained and associated with the file data, regardless of the growth in the amount of data as a result of various functions/tasks carried out by the System 50. The DIN and login authentication information are maintained in SQL tables which are themselves maintained at a secure data center. With the exception of the requirement to input login information for authentication, the DINLOG is transparent to the user(s) of the System.

2. XMLU

The XMLU module 64 is a web-based solution to alleviate much of the time and energy that is normally required to allow two organizations with different data definitions to seamlessly transfer and convert complex data sets for downstream processing. The XMLU module is designed to accept a user's incoming data, and convert it to data structure for use in the System 50. The XMLU module 64 transforms user data field names, applies the appropriate data rules, and sends the resultant data to the System's document processor.

One unique aspect of this module is that users from remote locations are empowered to work in an easy-to-use, collaborative environment. When two organizations or users try to work together to match up hundreds of data fields between their two data dictionaries, this often proves cumbersome for both parties. The XMLU module 64 is designed to reduce the burden of transitioning to direct-feed document and/or data services, save time for user(s), and make day-to-day changes easier and more collaborative between users.

More specifically, the XMLU is a data translation module designed to permit the relating of data based on a mapping of data via SQL Tables. The mapping of data can be accomplished automatically by the module 64 if the mapping is known. Mapping can be customized by the system administrator if the data relationships are determined by the entity desiring the mapping. The XMLU mapping to facilitate transfer of data between modules of the System 50 is programmed and therefore "known" by the XMLU. This enables the modules to communicate seamlessly as part of the System 50. The XMLU module 64 can be programmed to recognize certain external data import sources including a manual data input template prepared by the Mortgage Originator, loan origination system and loan document preparation engines, or other similar data sources selected by the Mortgage Originator Settlement Agent. The XMLU module 64 also serves as the data export mechanism of the System 50. The XMLU module 64 can be programmed to translate System data so that it is usable with certain external data export destinations, including internal accounting or financial systems. The XMLU module 64 is transparent to the System user.

Figure 3:
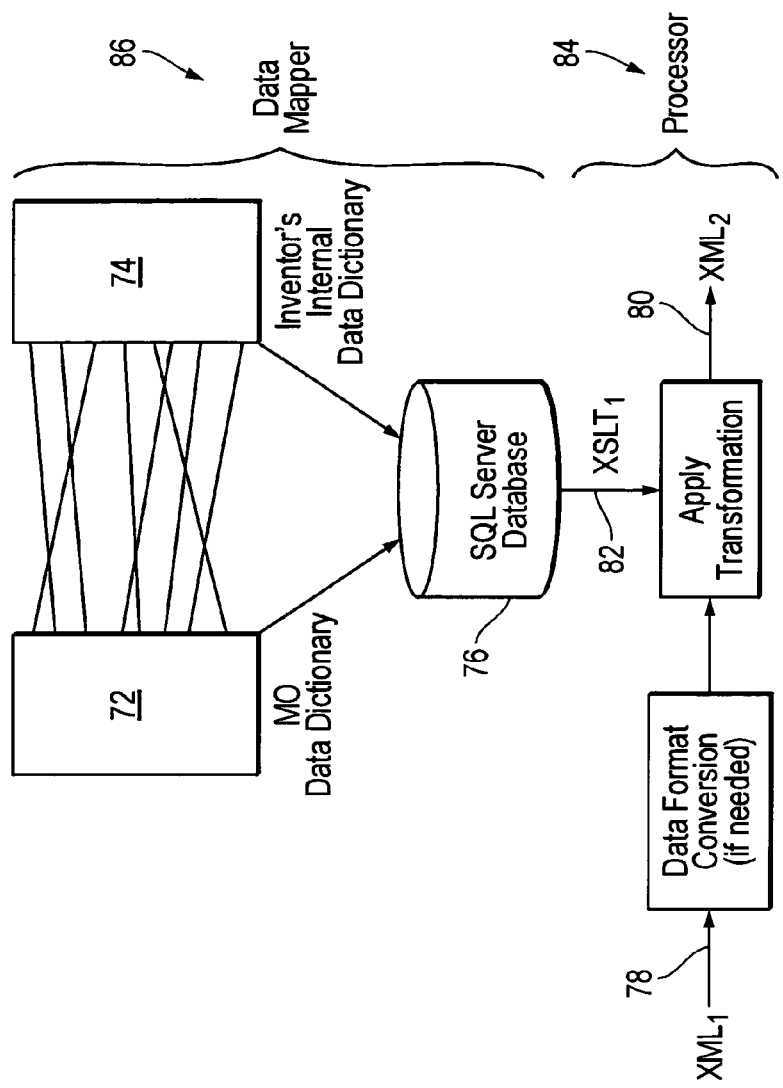
FIGS. 3 and 4 are block diagrams that illustrate the data mapping capability of one of the modules of the System in accordance with an embodiment of the present invention.
Figure 4:
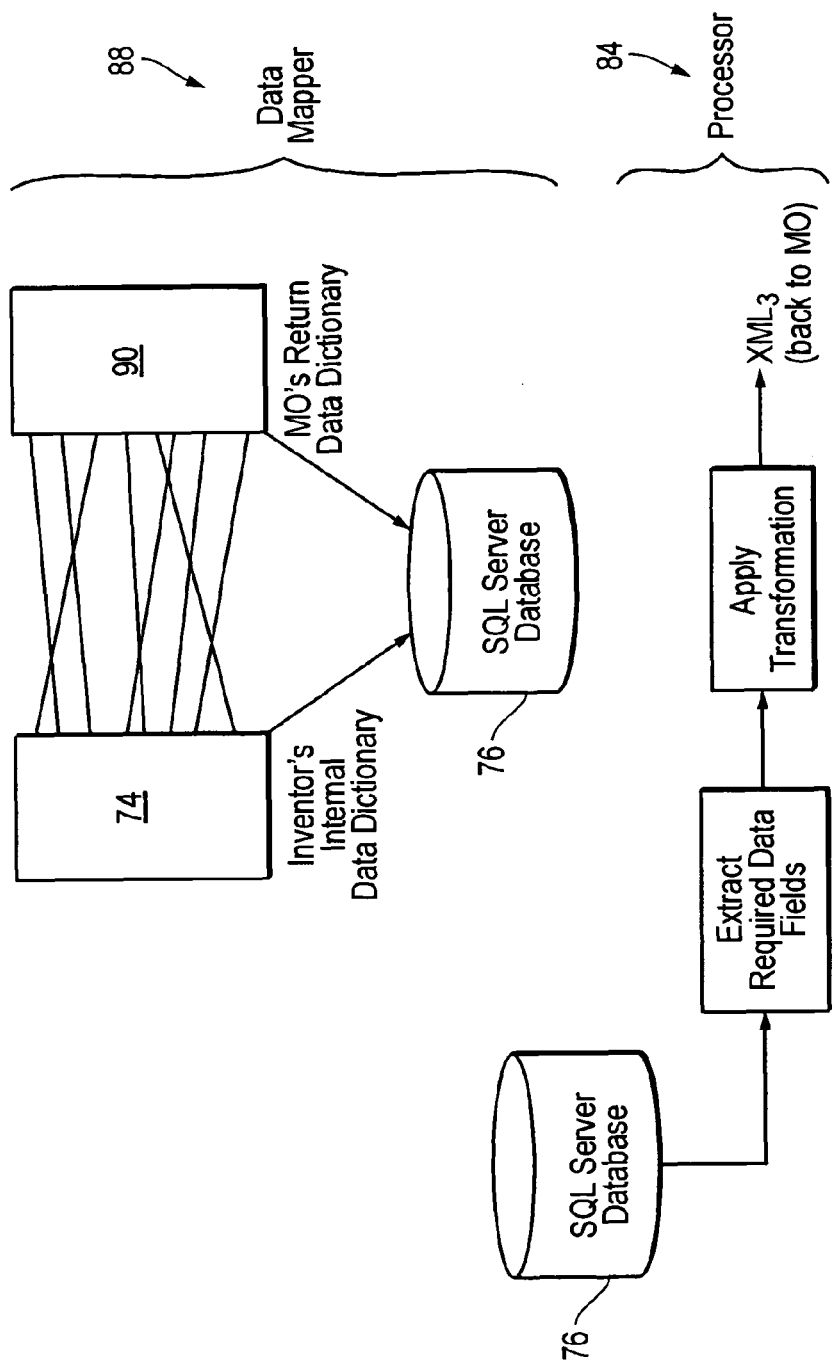

The XMLU module is designed to map two data dictionaries to each other on a field-by-field basis (see FIGS. 3 and 4). The XML Data Mapper 86 allows users from remote locations to log in and then:

(i) View the source 72 and target 74 data dictionaries including field names, data types, and detailed field descriptions;

(ii) Add, edit, and delete the data fields in these data dictionaries (depending upon the user's access rights);

(iii) Then, in a point-and-click environment, link up the source and target fields; and (iv) Add business rules as needed.

The information on the source 72 and target 74 data dictionaries is stored in SQL Server 76. Once the fields within the two data dictionaries are mapped, an XSLT (eXtensible Stylesheet Language: Transformations) file 82 is generated and stored in a directory on the server.

This XSLT contains all the information necessary to transform the incoming XML file 78 (based on the source data dictionary) into a new XML file 80 that conforms to the target data dictionary format.

To apply this transformation, a separate processor 84 is invoked. This process can be, e.g., either an executable program or an ASP.NET script, depending upon the implementation. This process is typically also responsible for picking up new data files as they come in, converting them to an acceptable XML format (if not already in XML format, or they are in an XML format that is not compatible with the XML Data Mapper), applying additional business logic as required, and forwarding the resultant XML to its target location. To accommodate virtually any incoming data format, this process can be modified to suit a user's specific needs.

The XML Data Mapper interface can be custom configured for all loan data submittals coming from the Mortgage Originator. This is accomplished via submission of the raw data files to the system administrator in a number of different ways, depending on the Mortgage Originator's preferences, including FTP, HTTP post or SOAP. The administrator can also customize the processor 84 to handle a number of different file formats including XML and delimited text files.

The administrator can then configure another XML Data Mapper 88 (see FIG. 4) to return data 90 back to the Mortgage Originator. This could be all resultant data or only those new fields that have been derived or calculated during the document processing.

3. DAM

The DAM 66 performs the custom-selected audit of loan file data as directed by the Mortgage Originator. The DAM 66 does not perform the mandatory audits (hereinafter defined) which are carried out within the H1M 68. However, the DAM 66 will permit the consolidation of its audit results findings with those from the mandatory audits for viewing by the users of the System 50. The DAM audit results are maintained in SQL tables maintained at a secure data center. Provided that the file data has been imported or input into the System 50, the DAM 66 may be utilized on a stand alone basis without the need to launch audit requests from within H1M 68.

4. H1M

The H1M 68 is the primary calculation and document production module of the System 50. It is the module that accepts data from all other modules of the System 50 and/or the Mortgage Originator and Settlement Agent in order to: facilitate the creation of a HUD 1/1A settlement statement; carry out automated file audits; call for additional audits to be carried out by the DAM 66; request and receive loan funds; and if elected by the Settlement Agent, disburse closing proceeds. The H1M 68 contains certain access restrictions and protocol which are described below.

The H1M 68 is also capable of receiving and utilizing electronic signature(s) as regulated in the Electronic Signatures in Global and National Commerce Act (the E-Sign Act). The H1M 68 permits the Settlement Agent to import the electronic signature of any signing party of the subject transaction and select documents into which it may be placed. The System 50 permits the electronic signatures to be placed on any of the documents requiring signature which are prepared by the System modules. The placement of the electronic signatures is determined by the identity selection relative to the respective signature. The Settlement Agent is responsible for confirmation and certification of the identity of all signers to a real property transaction. In this capacity, the Settlement Agent selects the relativity of each electronic signature and the identity of the signer.

Once an electronic signature has been inserted into the documents, it may not be removed without authorization by the system administrator. Such authorization will not be available in the event that it would cause a violation of the E-Sign Act, or other similar laws or regulations.

The Settlement Agent is responsible for confirmation and certification of the identity of every signing party (borrower/buyer and seller, if applicable) in every real property transaction. The H1M 68 has the further ability to receive and retain the identity information, including photographs relating to the identification validation. At the option of the Settlement Agent, or Mortgage Originator, the H1M 68 will permit the Settlement Agent to automatically import a photographic image for use in creating an affidavit produced for signature and notarization in connection with the subject closing.

The Mortgage Originator may choose to require the Settlement Agent to use the H1M identity affidavit and data retention function at any time prior to closing by adding the requirement to the closing instructions issued to the Settlement Agent. The Settlement Agent may elect to use the H1M identity affidavit and data retention function even if its use is not a requirement of the Mortgage Originator.

To use the identity affidavit and data retention function, the Settlement Agent launches an identity affidavit production routine from within the H1M 68. If the necessary digital image(s) and identity information already exists within the H1M, the Settlement Agent may select to view and/or print the affidavit. The H1M will populate as much of the signer identity information as possible for the identity affidavit(s). If the necessary digital image(s) and identity information does not exist, the Settlement Agent must import the necessary digital image(s) and input any outstanding identity information for the identity affidavit. Any outstanding identity information may be input by the Settlement Agent directly into the affidavit template form. Any digital image(s) imported by the Settlement Agent for the identity affidavit must meet the H1M's indicated specifications which are displayed on the user's screen. The specifications may include digital image size and format and other requirements for accurately producing the identity affidavit. Upon importing the digital image(s), the Settlement Agent must associate it with the appropriate signing party. Upon matching the digital image and the party name identification, the Settlement Agent may choose to print the affidavit or simply retain the information within the H1M 68.

The H1M 68 maintains the identity affidavit information along with other transaction data in SQL tables in secure storage.

5. DCM

The DCM 70 is a very specific use module designed to facilitate the electronic transmission of loan funds for the subject real property transaction closing. In the preferred embodiment, the DCM 70 is the only module that, in order to be optimally electronicized, incorporates System software that is to be installed at the Settlement Agent client computer location(s). One of ordinary skill in the art will recognize that DCM 70 may also be a Web-based product. It is designed to provide secure automatic funding and/or disbursement of funds. To fund the loans, the DCM 70 receives the XMLU data feed at the discretion of the Warehouse Funding Source. The DCM 70 enables the Warehouse Funding Source to securely transmit loan funds to the Settlement Agent via electronic check delivery. The Settlement Agent utilizes the DCM 70 to securely retrieve an electronic check to use for the subject real property transaction closing. If elected by the Settlement Agent and agreed to by the Mortgage Originator and Warehouse Funding Source, funds may be transmitted to Settlement Agent by Warehouse Funding Source via a traditional manual method. In the event funds are transmitted to Settlement Agent in a traditional manual method, the DCM's function is primarily to provide the System 50 with a confirmation that funding has occurred, and the details relating to such funding (amount, when, delivery method, etc.) The Settlement Agent is not required to, but may elect to use the DCM 70 to disburse fees and closing proceeds from the subject real property transaction closing. The DCM 70 is transparent and not accessible to Mortgage Originator.

III. Operation of the System

The System 50 permits multiple users to input and/or import data into an interne based system via the XMLU 64. The System 50 requires various levels of permissions and control based on the user's involvement, functional position or contribution in the real property transaction.

For example:

1) The Mortgage Originator is permitted to begin the process, but cannot complete it without interaction of the Settlement Agent.

2) The Settlement Agent can interact with the Mortgage Originator, but cannot request loan funds without approval by Mortgage Originator and Warehouse Funding Source.

3) The Mortgage Originator has sole control to limit the Settlement Agent's access to lender-defined portions of the H1M 68.

4) The System automatically prompts the Mortgage Originator in the event of a change to the HUD 1/1A after approval by the Mortgage Originator.

5) The Warehouse Funding Source is prohibited from entering data in the H1M 68, but can be permitted to view the completed settlement statement and/or audit results reports 6) Outside parties such as real estate professionals, etc. are prohibited from entering the System 50, but may receive an electronic copy of the resulting HUD 1/1A settlement statement.

These and other permissions, restrictions, and controls are described in more detail herein.

The System 50 permits the Mortgage Originator to custom-select automatic audits of the input (or imported) data to ensure compliance with government regulations, closing instructions, secondary market investor requirements, title underwriting requirements, and Warehouse Funding Source requirements, where applicable.

The System 50 provides for automatic status notices and communication between users via electronic communication. The System 50 permits the automated requesting of the correct loan funds and closing fees necessary in connection with either a purchase or refinance of the subject real property.

The System 50 facilitates the availability and delivery of loan funds via three alternatives:

1. Secure request and delivery of digital online Certified Check via DCM 70;

2. Cashier's Check via manual delivery; and

3. Wire Funds from Warehouse Funding Source to Settlement Agent.

The System 50 permits the Settlement Agent the ability to automatically disburse closing proceeds via electronic check or paper check. The System 50 captures and retains all input (and imported data) for use in post-funding and tracking reports.

The System 50 incorporates data that is imported or otherwise input by its operation or users during the prescribed process. Though imported into the System 50 via XMLU 64 through a secure site on the Internet, the data is stored in the System's SQL tables which are maintained as part of the System's H1M 68 and/or DAM 66, at a secure data center.

A. Use of System

1. Login and Start of System Processes

Each user logs into the System 50 at a login screen. First-time users are required to create login authentication information by selecting username, password and functional contribution (Mortgage Originator, Settlement Agent, or Warehouse Funding Source).

After the first login, the user will be required to re-enter the user name and password for authentication at each subsequent login. If a user experiences three consecutive login failures the user is locked out of the System 50 and must contact the system administrator to reset authentication information. All authentication data is maintained in DINLOG 62. Users are restricted on access to modules and/or parts of the system based on their functional contribution or role in the real estate transaction.

The Mortgage Originator causes the System 50 to import data from a Loan Origination System/Document Preparation Engine (LODPE) 92 via the XMLU 64. A number of Loan Origination Systems and Document Preparation Engines are commercially available and would be suitable for use in conjunction with System 50. The System 50 utilizes the import of LODPE data by the Mortgage Originator, but it does not provide for the delivery of the documents produced by the LODPE to the Settlement Agent. As an alternative to importing LODPE data, the XMLU 64 permits the Mortgage Originator to input required data using an input template. The input template permits the XMLU 64 to take the input form the user and translate it into the same format as any data that is imported from other sources. This input/import of data by the Mortgage Originator user begins the System's procedure of creating a HUD-1/1A settlement statement (see FIG. 1A).

The Mortgage Originator's input and/or import of data includes the closing instructions from the Mortgage Originator and directed to the Settlement Agent. The System creates automatic addendum to the closing instructions to the Settlement Agent, based on changes approved by the Mortgage Originator and the outcome of the selected automatic audits of data (input or imported) which are performed at specific intervals during the System's routines.

2. Prefunding Audits

Before proceeding directly to the completion of the Mortgage Originator's portion of the HUD 1/1A, the Mortgage Originator user is prompted to select from a menu of automated audits (the Prefunding Audits), which will be carried out by the System 50 on the data thus far incorporated for the subject property transaction.

The Mortgage Originator may select custom audit arrays to be performed by the DAM 66 in the following general manner:

1) Select audit arrays for each individual loan transaction;
2) Select same audit arrays as used in Mortgage Originator's most recent loan transaction carried out by System; and
3) Select from choices of audit arrays suggested by System and/or set by Mortgage Originator during a previous System session.

Once the selections have been made by the Mortgage Originator either directly in the DAM 66 or though the H1M 68, the System 50 carries out the audits automatically and displays the results in summarized fashion for Mortgage Originator review.

The H1M 68 performs certain mandatory audits ("Mandatory Audits") on each file before proceedings to the creation of the HUD-1. The H1M 68 also performs the Mandatory Audits throughout the process of creating and approving the HUD 1/1A. The Mandatory Audits include:

1) Section 32/Predatory Lending—Certain state, county and local laws and Federal Regulations contain provisions prohibiting and/or restricting loans which are considered potentially predatory (i.e., too high or not in the best interest of the consumer) in terms, rates and/or fees. The predominant conditions for a loan to qualify as a predatory loan include: (i) the loan must be a refinance or home equity installment loan; and (ii) the results of a mathematical calculation using the interest rate and fees associated with the loan do not satisfy Federal regulations. The System detects the purpose of the subject loan using the file data and will not launch a notice of potential for violation of this audit unless the loan satisfies the first condition above. The results of the calculations are compared to the hurdle figures set forth in the regulations, as adjusted. The H1M 68 module will automatically perform the necessary mathematical calculations to test for compliance with Section 32 of Regulation Z in conjunction with the Truth in Lending Act, as amended. The mathematical calculations carried out during this audit can be modified by the system administrator to ensure compliance with any future regulatory changes. If the mathematical calculations indicate the potential for violation of the predatory lending regulations (the second condition above), the H1M 68 will immediately suspend the operation, notify the user of the potential violation and require specific authorization in order to continue with the preparation of the HUD 1/1A settlement. Any predatory loan warning will automatically be included in the funding request sent to the Warehouse Funding Source unless necessary corrections are made to the file data prior to the funding request.

2) OFAC—The USA Patriot Act calls for more vigorous enforcement of checking customer names against lists created by the Office of Foreign Assets Control (OFAC). The lists contain names of known or suspected terrorists, terrorist organizations, and other listed persons or countries. This audit portion of the H1M compares the borrower (and any co-borrowers) name against the OFAC's database. The results of the OFAC routine are displayed as part of the audit results reporting.

3) Property Zip Code—This audit compares the zip code of the collateral property described in the file data with the zip code database maintained by the United States Postal Service. The audit seeks to positively match the stated zip code with the database zip code. This serves multiple purposes including: (i) verification that property can be identified by a third party; (ii) close approximate location verification; (iii) enhances validity capability to other automated audits carried out by the H1M 68 and/or DAM 66.

4) New Document Generation—The H1M 68 audits entered data to determine if any new disclosure documents are needed in order to have a compliant closing. If any new documents are required, the H1M 68 can cause the creation of the new document via insertion of the new or corrected data into a word processing version of the required form, and then may make such form available to the Settlement Agent and/or Mortgage Originator as a portable document format (PDF) image form ready for printing and signature.

5) Insured Closing Service Letter (a/k/a Closing Protection Letter)—An Insured Closing Service Letter is a document issued by a title insurance company which protects a mortgagee against Settlement Agent malfeasance and failure to follow specific closing instructions. The H1M 68 searches the file data to determine the existence of an electronic Insured Closing Letter. The audit also seeks to positively match the title insurance company to the identity provided by the Settlement Agent. In the event of a failure to locate the insured closing letter and/or positively match the identities, the H1M 68 will notify the Mortgage Originator of the failure and require specific approval by the Mortgage Originator before permitting the completion of the proposed real property transaction within the H1M.

6) State High Cost Loan Audit/Comparison—Many states have their own measurement specifications for maximum fees an originator can charge with respect to an individual residential property loan. The State High Cost Loan Audit/Comparison compare the fees set forth in the loan file data against the maximum amounts permitted under the respective state's statutes. The results of the State High Cost Loan Audit/Comparison routine are displayed as party of the audit results reporting.

The System 50 carries out the Mandatory Audits at planned intervals until the operation is completed, the subject real property transaction is closed, and all funding/disbursement is complete. The System's planned interval of audits contemplates audit arrays being performed:

a) Immediately following the import or input of data by the Mortgage Originator, prior to the notice to Settlement Agent of a pending HUD 1/1A (Prefunding Audits);

b) During the time the HUD 1/1A is in the process of completion and certification by both the Mortgage Originator and Settlement Agent (Funding Audits); and c) At such time as the Settlement Agent certifies the accuracy of the funding request to both the Mortgage Originator and the Warehouse Funding Source (i.e., Post Funding Audits).

Other audits, including after Settlement Agent certification, are also possible.

In a preferred embodiment, the Mortgage Originator may select additional audits from the System's menu, but may not delete the Mandatory Audits without administrator override approval. In the event that the System 50 determines a failure to pass audit criteria at any such time as it performs an audit, the System will suspend progress on the subject loan file and require the user to:

1. Modify the subject loan file data such that it complies with the necessary audit standard;
2. Obtain system administrator override approval; or
3. Terminate the session.

Other custom-selected audits which can be automatically performed by the System 50 at this stage include, but are not limited to:

1) Mortgage Electronic Registration System (MERS) Registration—MERS was created by the real estate finance industry to eliminate the need to prepare and record assignments when trading mortgage loans. This audit determines if the subject loan has been assigned a MERS Identification Number (MIN) and the accuracy thereof by comparing file information to the MERS database controlled by Merscorp, Inc.

2) Automated Valuation Model (AVM)—The AVM has been developed to provide the lending industry participants with a third party verification and reasonableness testing tool. The AVM audit determines if the subject property appraisal figure is within a selected valuation tolerance. The AVM audit uses comparable information from databases linked to the DAM 66.

3) Other Custom Designed Audits—The DAM permits the Inventor or the Inventor's authorized agent to insert computer instruction code relating to customized comparisons and integrity audit routines using the Loan File Data. These inserted comparisons or routines may be designed at a later date and may replace certain existing comparisons or integrity audit routines.

All automated audits carried out by the System 50 are performed by comparing the data input and/or imported by the user to a relevant database or rules module associated with the H1M or DAM 66.

The System 50 is intended to function as an automated multi-user transaction closing, audit and funding platform, capable of providing Mortgage Originator-specified amendments to the original closing instructions.

The H1M 68 employs an automated closing instruction addendum function which, depending on the results of the automated audits and resulting reaction by the Mortgage Originator, generates an automatic written notification to the Settlement Agent appending any previous closing instructions. The closing instructions issued to the Settlement Agent may be generated as follows:

1) Closing instructions issued directly to Settlement Agent by the Mortgage Originator in connection with the LODPE 92;

2) Addendum to the Closing instructions prepared by the System at time Mortgage Originator initiates the creation of an online HUD 1/1A (within the H1M 68); or 3) All closing instructions issued by the Mortgage Originator to the Settlement Agent as a result of audit results or other reasons and maintained in the System's message board or elsewhere (e.g., within the HUD1/1A).

The System always provides for the automatic generation and issuance to the Settlement Agent of first amendment to closing instructions when the Mortgage Originator imports the data from the LODPE 92. The first amendment to closing instructions will include instructions to the Settlement Agent that the Mortgage Originator's closing instructions (as amended in connection with the System and/or directly in writing from the Mortgage Originator) will be strictly followed by Settlement Agent. Further, the Settlement Agent's instructions will prohibit making non-electronic modifications to the document(s). The Settlement Agent compliance with closing instructions, as amended, helps ensure the matching of paper documents, if any, relating to the real property transaction.

All data imported into, input into and/or created by the System 50 in connection with a real property transaction is maintained in a unique packet of data, called the file data, which relates only to the subject transaction. As part of the file data, the System 50 can maintain a time and date log for each data entry and activity carried out by the System and/or its users. The System 50 can also use an imbedded Per Diem Clock to accomplish this date and time stamping. All date and time stamps are read only to users. They are automated by the System and cannot be changed.

After performing the Prefunding Audit and Mortgage Originator modification of file data, if any, the System 50 causes the file data to automatically populate the portions of the HUD 1/1A which are directly specified by the Mortgage Originator via the closing instruction included in the LODPE and/or file data assembled thus far in the System 50.

The System 50 is unique in that it can incorporate the use of a HUD 1/1A which is produced on letter size paper. The System 50 can also include imbedded regulatory help text and definitions which are accessed by the user via a mouse-over function and elsewhere within the System.

The user (first the Mortgage Originator and later the Settlement Agent) can review and approve each of their respective individual HUD 1/1A entries, groups of entries, or the entire preliminary HUD 1/1A before proceeding to the next stage in the H1M 68.

The System 50 is unique in its ability to add HUD 1/1A fee lines dynamically based on the requirements of the individual transaction. The dynamic growth is accomplished by adding section fee line items in the respective section of the HUD 1/1A. The security of the sections controlled by the Mortgage Originator and the Settlement Agent is not compromised by this dynamic line addition feature. The System 50 permits dynamic addition of fee lines without compromising the compliance features of the resulting HUD 1/1A.

The System 50 does not permit the Settlement Agent to make changes to the data input by the Mortgage Originator, and vice versa. The Mortgage Originator must approve the lender portion of the HUD 1/1A separate from the Settlement Agent, thereby eliminating the risk of multiple HUD 1/1A's for a single transaction as a result of incorrect preparation of lender-specified items by the Settlement Agent. This feature also substantially eliminates the opportunity for last minute unauthorized changes to the HUD 1/1A. This can prevent third party causation of predatory lending and investor policy violations, which may cause a violation of predatory lending regulations and/or dismay on the part of a borrower.

Once the Mortgage Originator has approved the HUD 1/1A for sending to the Settlement Agent, the System automatically notifies the Settlement Agent via electronic communication that a partially completed HUD 1/1A is awaiting completion (see FIG. 1A). The Mortgage Originator may elect to cause the System to send an electronic notice to all other parties involved in the property transaction, using the contact information input by the Mortgage Originator, or found in the file data. The other parties may include, but shall not be limited to:

1) Buyer/borrower;
2) Seller;
3) Mortgage Broker/Loan Officer;

4) Real Estate Agent(s); and

5) Attorney(s).

At such time as the Settlement Agent inputs all of its data, the System 50 will permit the Settlement Agent the opportunity to review and approve each of its individual HUD 1/1A entries, groups of entries, or all of HUD 1/1A entries before proceeding to the next stage in the H1M 68. Once the Settlement Agent approves the HUD 1/1A, the System 50 automatically generates an electronic notice to the Mortgage Originator that the Settlement Agent has completed its portion of the HUD 1/1A setup and is prepared to proceed with closing/funding (see FIG. 1B). The System 50 can require the Settlement Agent to certify that all closing instructions have been and/or will be followed before the System will complete the Settlement Agent portion of the HUD1/1A and send the notice of such Settlement Agent completion to Mortgage Originator.

The notice sent to Mortgage Originator can confirm whether the Settlement Agent has completed its portion of the HUD 1/1A and has certified compliance with closing instructions. The notice sent to Mortgage Originator can contain an automatic link to the System 50, which when selected by Mortgage Originator, will launch a predetermined funding audit (the "Funding Audit") of the file data as it exists up to that point in the System. The results of the audit will be displayed for the Mortgage Originator, with copies being sent via electronic message to any party selected by Mortgage Originator. The Funding Audit is carried out in the same fashion as the Prefunding Audit, but may not include the same audits selected by Mortgage Originator in the Prefunding Audit. In a preferred embodiment, the Funding Audit will include the Mandatory Audits. The System will suspend processing in the event of an audit failure and require the user to:

1) Modify the subject loan file data such that it complies with the necessary audit standard;

2) Obtain system administrator override approval; or

3) Terminate the session.

After completion of the Funding Audit, the System generates an electronic funding request (the Funding Request) which is made available to the Mortgage Originator for review, along with the now completed HUD 1/1A.

3. Funding Audit Performance, Reporting, and Funding Request

The Funding Audit is carried out at such time as the Settlement Agent completes and approves its entry of data into the H1M. The action of the Settlement Agent approving its entries and certifying that the HUD 1/1A is ready for closing signatures is the System's trigger to perform the predetermined Funding Audit. See FIG. 1C.

The Funding Audit is predetermined based on the audit specifications of the Mortgage Originator's selected secondary market investor and/or as identified in the file data imported into the System. The Funding Audits may include, but will not be limited to:

1) Mandatory Audits (described above);

2) Good Faith Estimate/Interest Rate Lock Verification—The DAM 66 will verify the loan file data for the final good faith estimate contained within the Mortgage Originator's loan origination system data against the interest rate lock verification information contained within the loan file data and/or the Mortgage Originator's selected secondary market investor's database. Discrepancies are highlighted and presented as part of the audit results reporting.

3) APR Calculation—The DAM 66 prepares an independent calculation of the annual percentage rate using the loan file data. The resulting independent annual percentage rate is compared to the annual percentage rate imported as part of the loan file data. Differences between the DAM's independently calculated annual percentage rate and the imported figure are reported as part of the audit results reporting. Any differences between the independently calculated annual percentage rate and the imported figure will be displayed as part of the audit results reporting.

4) Geocoding Audit—The DAM 66 links certain loan file data to the Federal Financial Institution Examination Council's (FFIEC) database for purposes of matching the Metropolitan Area, State, County and Census Tract combination for the subject real property. The geocoding audit routine also retrieves demographic information about the resulting particular census tract. The results of the geocoding routine are displayed as part of the audit results reporting.

5) Other Custom designed audits—The DAM 66 permits the system administrator to modify the System to provide for customized comparisons and integrity audit routines using the loan file data. These comparisons or routines may be designed at a later date and may replace certain existing comparisons or integrity audit routines.

The System 50 can generate a summary report of all audit results and allow all parties authorized by Mortgage Originator to view the audit results summary report. The System 50 will permit the Mortgage Originator to electronically transmit a copy of the audit results summary report to outside parties of his/her choosing without having to grant such outside parties access to the System.

The System 50 will maintain the results of all audits performed within the DAM 66 or H1M 68 in a secure data storage center for future retrieval and reporting.

In the event there is no secondary market mortgage investor identified, the System 50 will prompt the Mortgage Originator to certify that the subject loan is not intended to be sold in a secondary market transaction and that the Mortgage Originator understands that the default set of audits performed during the Funding Audit may not include those required by a secondary market mortgage investor identified by the Mortgage Originator at a later date. This certification of no identified investor, if made by the Mortgage Originator, will automatically accompany an electronic funding request sent to the Mortgage Originator's Warehouse Funding Source.

The Settlement Agent must have a "Clear to Proceed" result from the Funding Audit or specific approval by the Mortgage Originator in order for the System to permit any action other than:

1) Modify the subject loan file data such that it complies with the necessary audit standard; or 2) Obtain administrator override approval; or 3) Terminate the session.

In the event that the file data is corrected and such corrections would impact the disclosures and other documents to be signed by the borrower, the System 50 can automatically generate or call for the necessary updated documents, including, but not limited to:

Truth in Lending

Section 32 Notice

Notice of Right to Cancel

Release of lien(s)

Title Company Forms (e.g., lien affidavit)

Borrower Notice of No Changes

System Communication

The System 50 facilitates automation of electronic communication between Mortgage Originator, Settlement Agent and the Mortgage Originator's Warehouse Funding Source in connection with a real property transaction. The System can also incorporate internet-based check funding software on the part of Mortgage Originator, Settlement Agent and Warehouse Funding Source to facilitate the automated certified check funding of loan proceeds in connection with the transaction. The System provides a funding mechanism that is contingent upon the Settlement Agent certification of no differences between the HUD1/1A generated by the System 50 and the actual HUD 1/1A signed by the buyer/borrower and seller. Portions of the internet-based check funding software are required to be installed on the Settlement Agent and Warehouse Funding Source local computers as an additional layer of security to further protect transaction funds.

4. Funding

The System 50 will cause the electronic transmission of the following items to the Warehouse Funding Source:

1) Initial Loan Summary (from Settlement Agent, after completion of Settlement Agent's HUD 1/1A data entry)—sent from H1M 68 via electronic communication. The Mortgage Originator will also receive a copy of the Initial Loan Summary. See FIG. 1C.

2) Net Funding Request from Mortgage Originator after approval of Settlement Agent's HUD 1/1A data entry—from H1M via electronic communication with a direct import of data into the DCM. See FIG. 1D.

3) Settlement Agent's Closing Certification from Settlement Agent—from H1M 68 via electronic communication with a direct import of data into the DCM 70. See FIG. 1D.

The System will automatically match the funding request data contained in the items sent to the Warehouse Funding Source. All variances will be detailed and displayed for Warehouse Funding Source and Mortgage Originator to view. The System requires the Warehouse Funding Source to select to either fund the subject loan or not at this point.

In connection with the Warehouse Funding Source approval to fund the subject mortgage loan, the DCM 70 will have the ability to compare the data contained within the following:

(i) Initial Loan Summary—this is the summary report that contains the gross funding figures and fees from the subject transaction, which will be reflected on the HUD-1.

(ii) Net Funding Request—this is the summary funding request that contains the summary of the figures reflective of the loan related funds and fees relating to the subject transaction.

(iii) Settlement Agent's Closing Certification—this is Settlement Agent's certification to the Mortgage Originator and Warehouse Funding Source of:

1. Final net funding figures required from the Warehouse Funding Source on behalf of the Mortgage Originator;

2. No changes to the HUD-1 to be signed by borrower; and

3. All closing instructions have been (or will be) followed by Settlement Agent. See FIG. 1E.

The Warehouse Funding Source can receive notice of the Initial Loan Summary, Net Funding Request and the Final HUD-1 Certification via electronic notice from the H1M 68. Any or all of the notices sent to the Warehouse Funding Source can contain a link which will prompt the Warehouse Funding Source to log into the System 50 to view the respective file information and/or audit results relative to the subject mortgage loan file.

The Warehouse Funding Source can cause the comparison of the Initial Loan Summary, Net Funding Request, and Final HUD-1 Certification data for a respective mortgage loan file at any time it is logged into the System 50. The results of the DCM 70 comparison will be maintained in the secure data storage of the H1M 68 for view access by the Warehouse Funding Source, Settlement Agent, or Mortgage Originator.

If the Warehouse Funding Source elects not to fund, the System 50 will automatically prompt the Warehouse Funding Source to enter an explanation of the decision not to fund. The explanation of the declination to fund will automatically be sent to Mortgage Originator. At this point the funding request may be restarted only by resubmitting Funding Request by Mortgage Originator which satisfies Warehouse Funding Source's requirements for funding. If necessary, the System will permit the Mortgage Originator and Settlement Agent to make changes to file data so that the Funding Request submitted by the Mortgage Originator satisfies the requirements of the Warehouse Funding Source for funding subject loan, and matches the Certification of Funding Request from Settlement Agent.

If the Warehouse Funding Source elects to fund the subject loan, in a preferred embodiment, the System 50 will cause the launch of the check funding software resident on the Warehouse Funding Source's client computer. In one embodiment, the System 50 utilizes a sub-system software component which is referred to herein as Digital Checks. Digital Checks provides the functionality to the System's DCM funding module 70.

Digital Checks can be a desktop application that uses the internet as a communication medium for sending secure checks to be used for loan funding as well as other disbursements electronically. Digital Checks can also be a Web-based product. The issuer of the check (the sender) may chose to issue a regular check, an electronic certified check, or a cashier's check. The System 50 contemplates that the Settlement Agent and/or the Warehouse Funding Source will select the method by which loan funding is facilitated by choosing one of the following methods while using the H1M 68:

1) Electronic Certified check;

2) Cashier's Check (may require additional fee to be paid to Warehouse Funding Source plus additional delivery time and charges); or 3) Wire Funds (may require additional fee to be paid to Warehouse Funding Source plus additional delivery time and charges).

In a preferred embodiment, Digital Checks is comprised of two PC resident software components known as the Send and Receive, respectively resident on the Warehouse Funding Source's and the Settlement Agent's client computers. The System 50 does not require that any party have both the Send and Receive components installed in the same location in order to function. However, the System does require that if the Warehouse Funding Source is to fund the loan via a digital check (Standard, Certified or Cashier's) then the Digital Checks Send program is required.

The System will allow the Settlement Agent to retrieve a digital check using either:

1) Digital Checks Receive program installed on Settlement Agent's client computer; or 2) System DCM module 70.

Once the sending client computer has the Digital Checks Send program installed, the user can set up accounts, passwords and digital signatures. This authentication information is stored within a segregated section of DINLOG 62 and registered with the Digital Checks support staff. The user will then download the latest address book and select the delivery location of the check. When the sender sends his check information to the receiver, it is actually being uploaded to the secure web server. The check information is stored and an email notification is generated and sent to the recipient. See FIG. 1F.

The receiver is notified of the waiting check via email, and opens the Digital Checks Receive program. When the recipient prints the check, a flag is sent to the secure web server telling it to not allow the recipient to print that check again.

This will also allow the sender to view when the check has been received and printed. See FIG. 1F.

Digital Checks Send program can work with the following unique security features that allow the user to create and send checks:

1. All passwords, signatures and account information are kept with the Sender;

2. Unique ID's are created for all program and all client computers;

3. Transmitted check information is sent securely over a SSL, 128 bit encrypted site and is in an image format which cannot be modified or retrieved more than a single time; and 4. All DCM programs must be registered with the Digital Checks support staff.

5. Data interface with outside financial and accounting functions

The System 50 is capable of automatic data interface with prevalent Settlement Agent accounting/internal reporting software programs, including but not limited to Ramquest, Softpro, and Landtech.

The System provides for customization of data import and export features to accommodate all users, including Mortgage Originator, Settlement Agent, and Warehouse Funding Source via XMLU module 64. Certain of these import/export processes may require mapping coordination through the data mapping utility by the system administrator.

IV. Process Summary

The following is a general summary of the steps that can occur during the process of closing a real estate transaction according to one preferred embodiment of the present invention. One of ordinary skill in the art will recognize that various other series of steps can be performed, and such other series of steps would be within the spirit and scope of the present Invention.

Mortgage Originator begins process through import of data into system.

System automatically audits imported data for selected issues (Section 32, OFAC, AVM, etc.).

Notice sent to Settlement Agent alerting him/her as to the existence of a pending settlement statement in System.

Settlement Agent inputs all remaining data and System automatically performs another battery of audits on data.

System sends notice to Mortgage Originator and others of pending settlement statement ready for final approval.

Funding request and settlement statement approved by Mortgage Originator.

Notice of Mortgage Originator approval sent to Settlement Agent with copy to Warehouse Funding Source.

Settlement Agent obtains signatures on all closing documents and settlement statement from borrower/buyer and seller (if applicable).

Settlement Agent certifies final settlement statement and net funding detail via electronic communication to Mortgage Originator, with copy to Warehouse Funding Source.

Mortgage Originator authorizes funds disbursement by Warehouse Funding Source.

Warehouse Funding Source funds amount specified on net funding detail received from Settlement Agent and authorized by Mortgage Originator.

Settlement Agent receives funds from Warehouse Funding Source and proceeds with disbursement of closing proceeds.

All executed documents can be sent to fulfillment vendor for post-closing review and shipping to investor.

Fulfillment vendor combines/correlates credit package information from Mortgage Originator with documents received from Settlement Agent, and ships entire package to wholesale lender.

V. Flow Diagrams

Figure 5A:
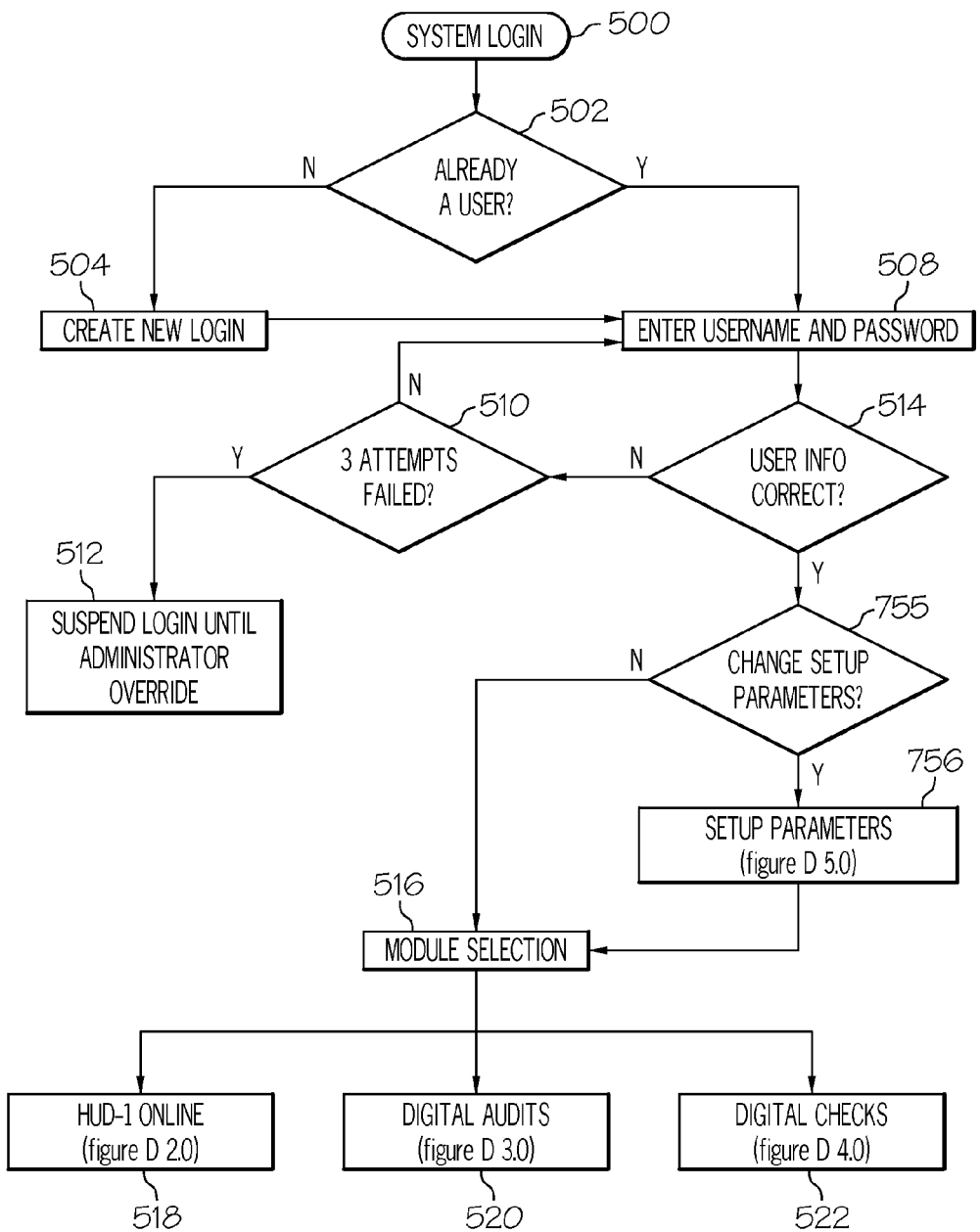
FIGS. 5A-5N are flow diagrams illustrating the sequence of operations that the System may perform in accordance with an embodiment of the present invention.
Figure 5B:
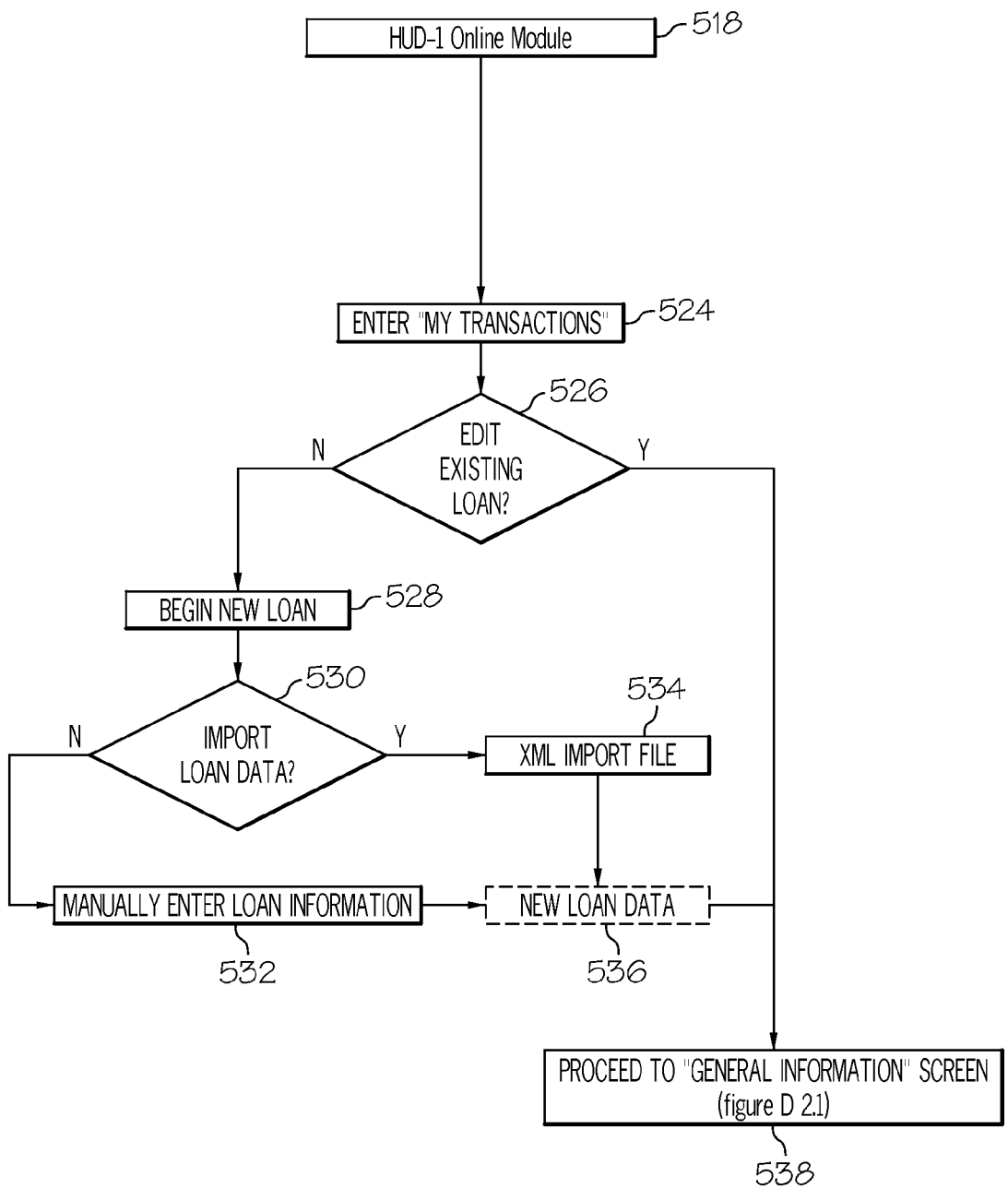
Figure 5C:
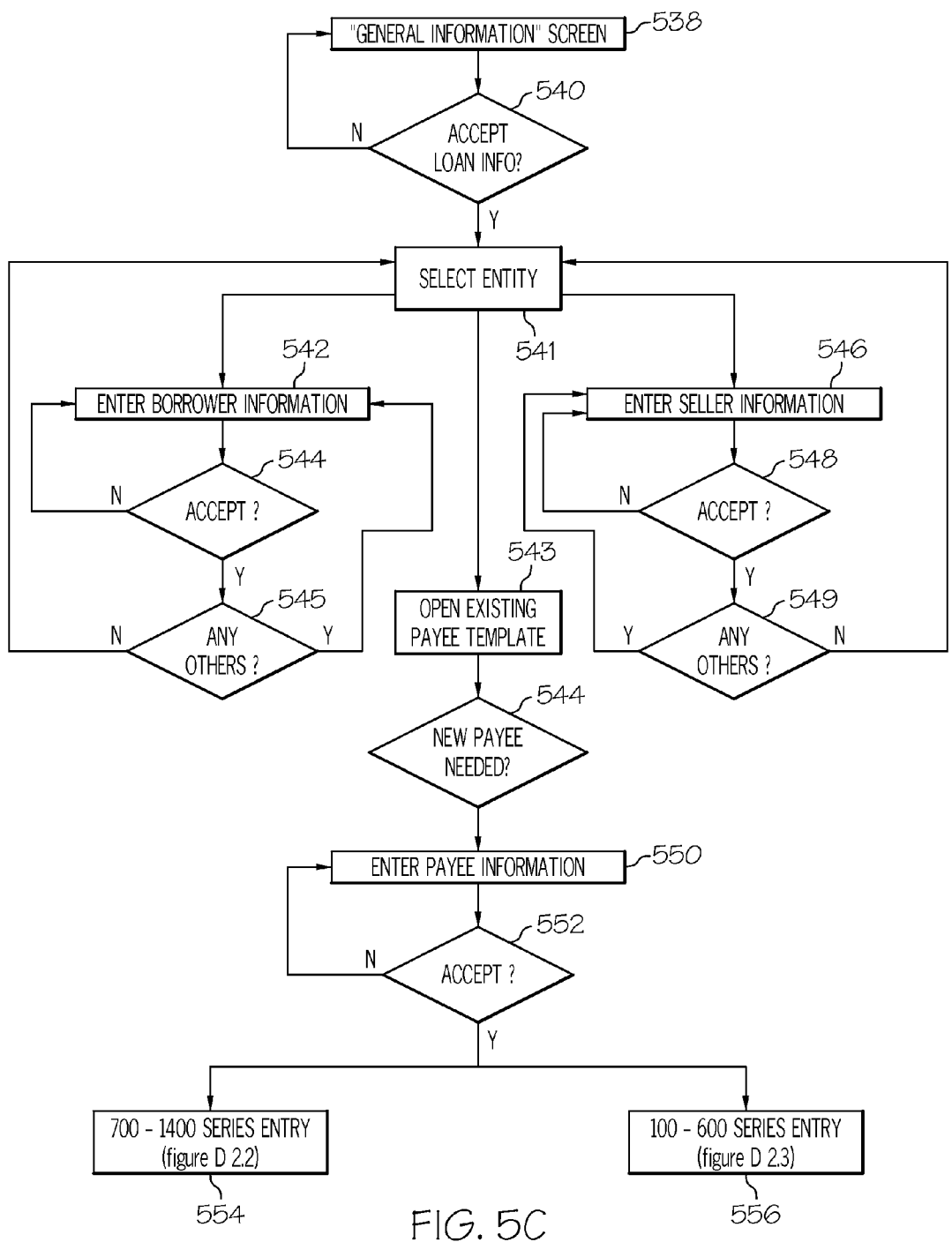
Figure 5D:
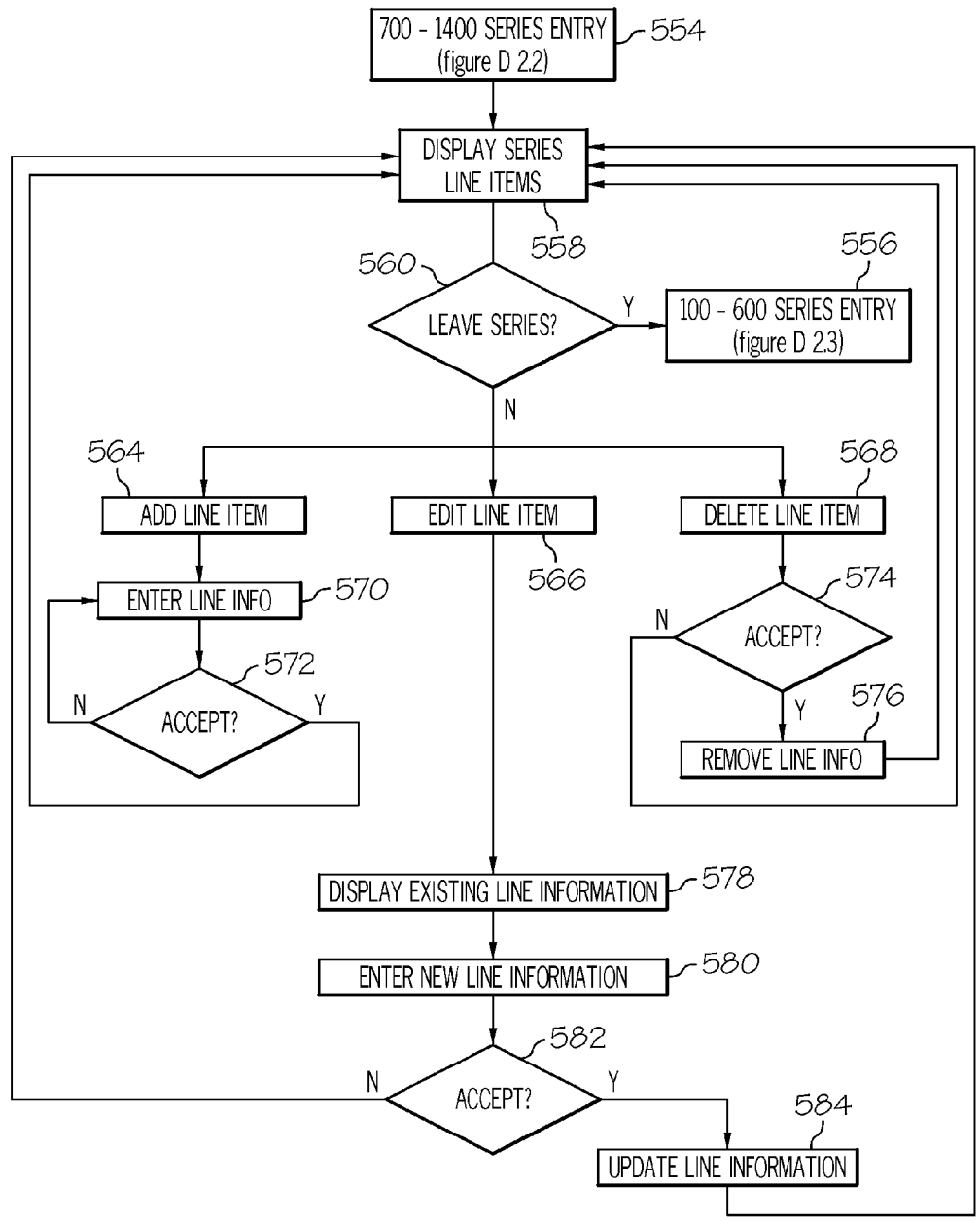
Figure 5E:
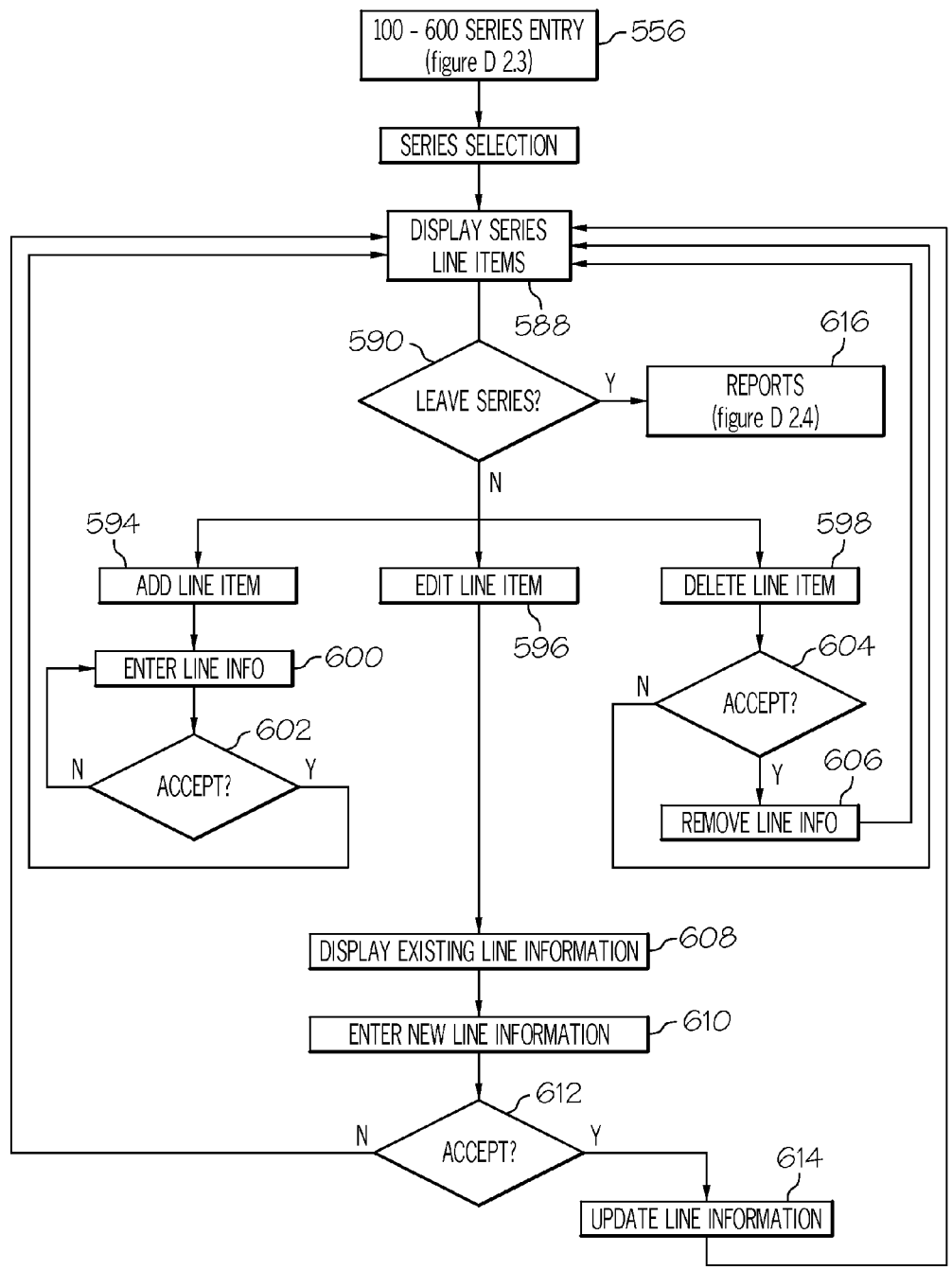
Figure 5F:
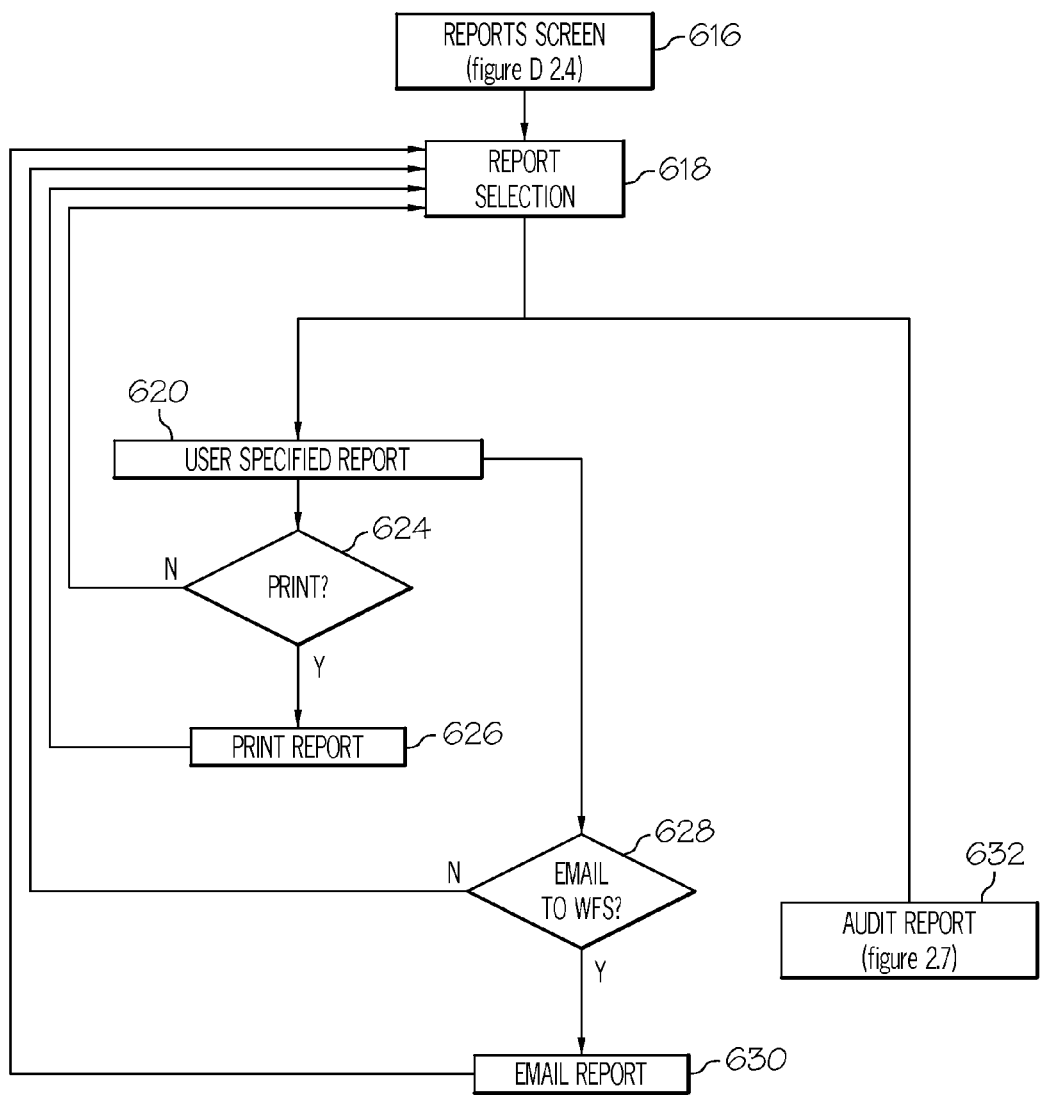
Figure 5G:
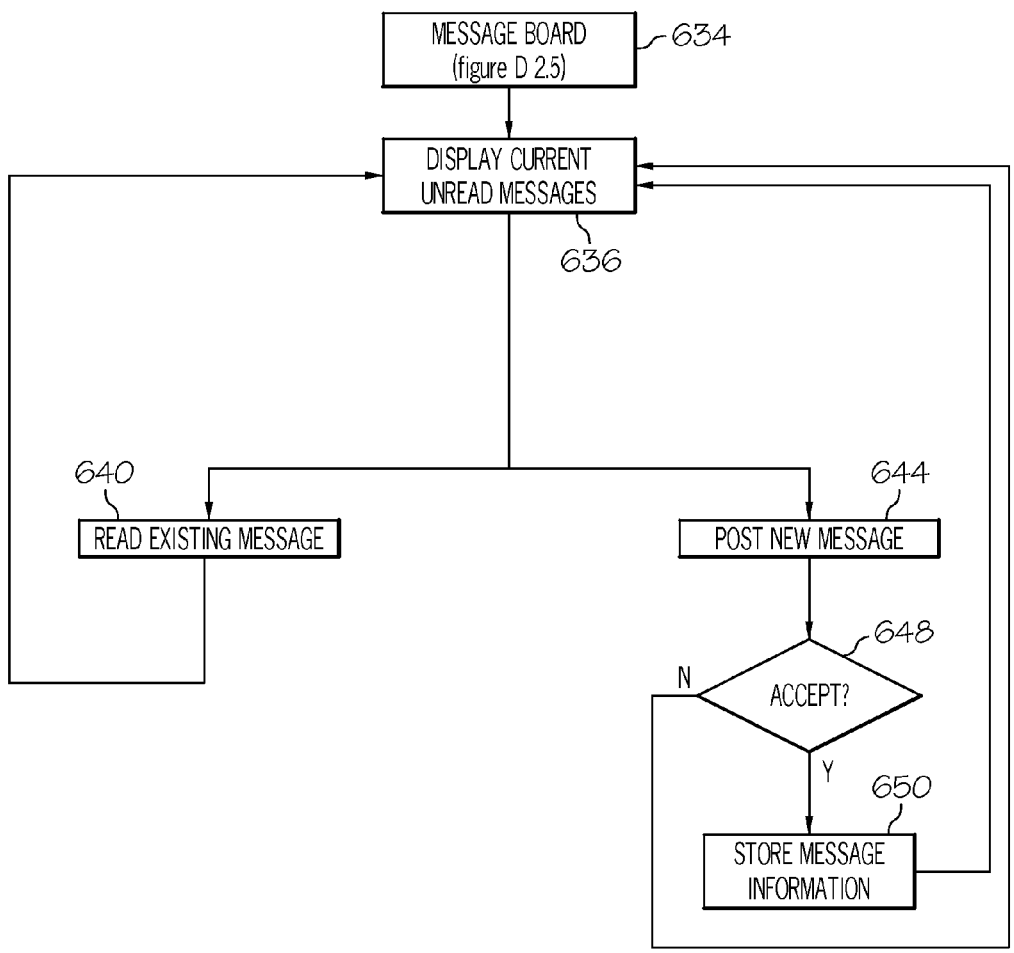
Figure 5H:
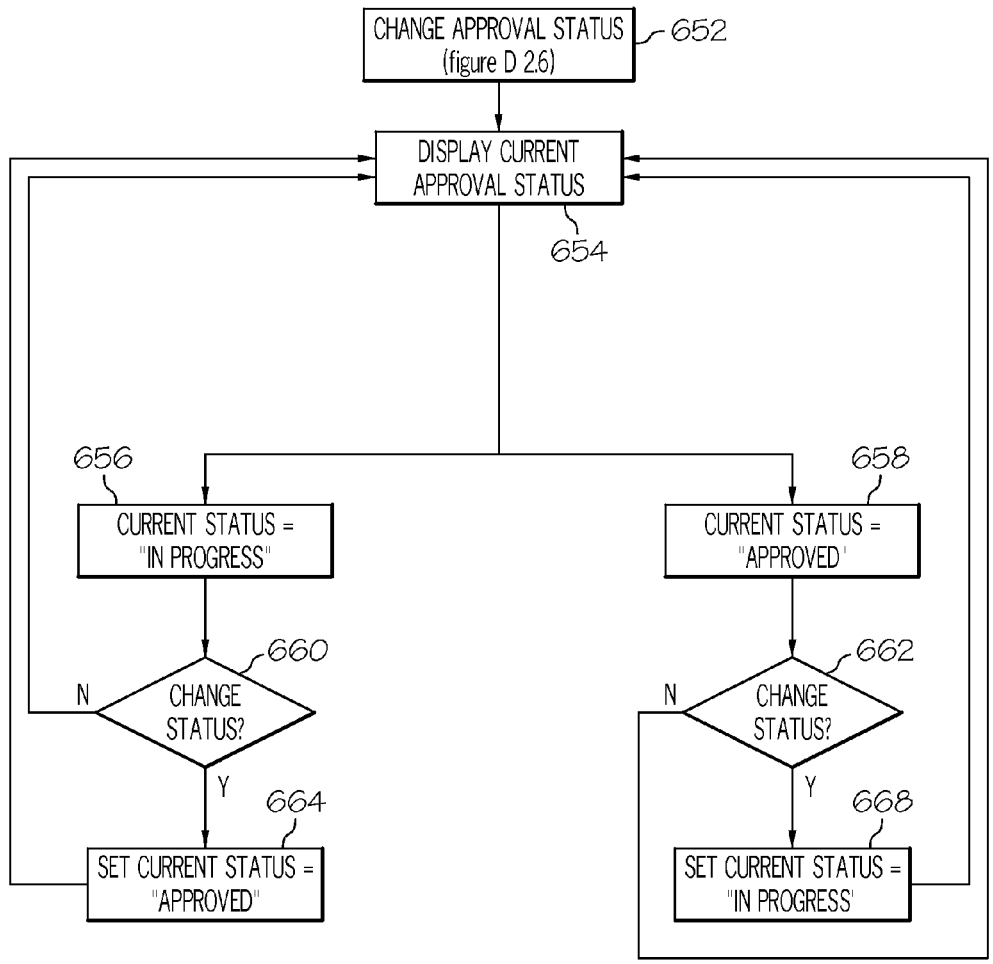
Figure 51:
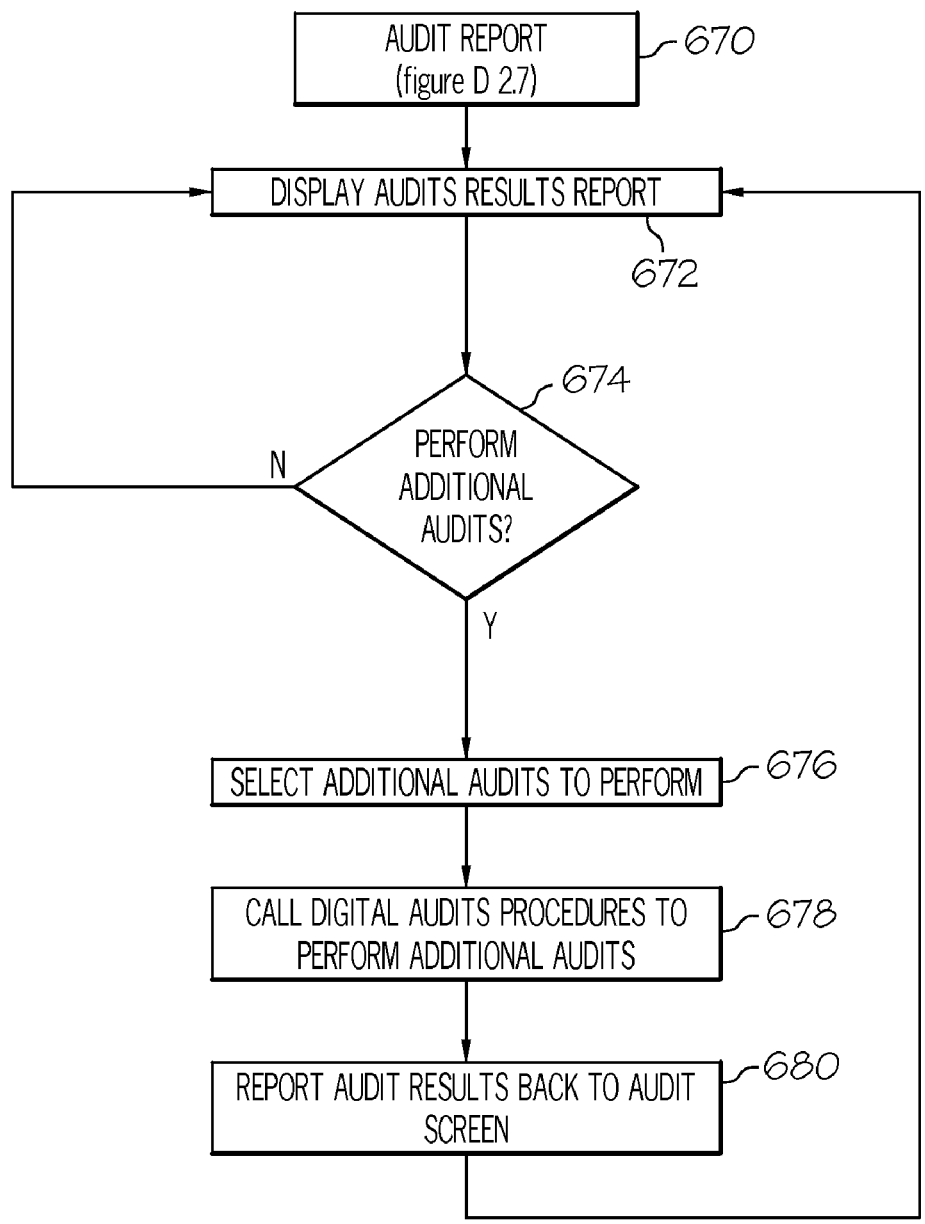
Figure 5J:
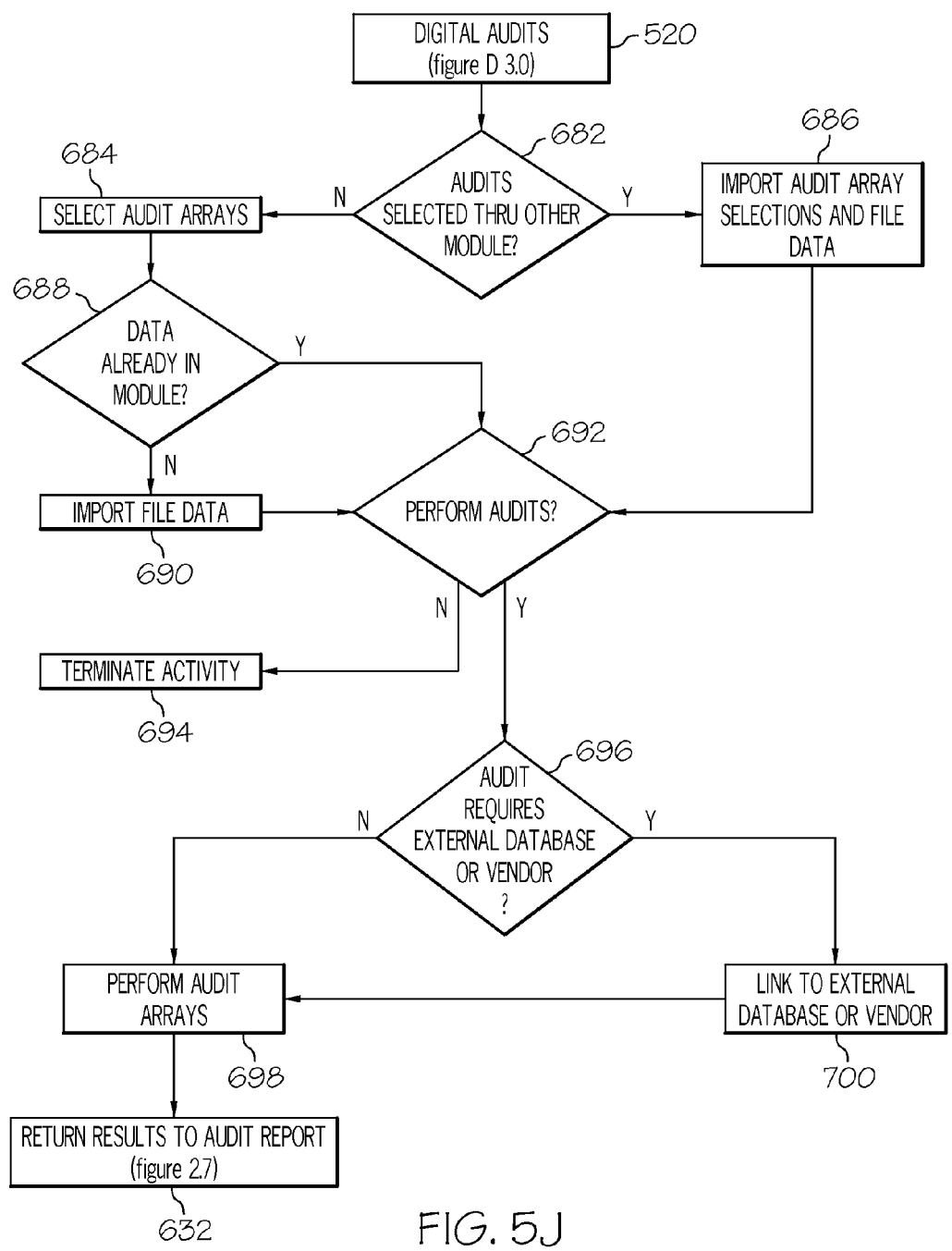
Figure 5K:
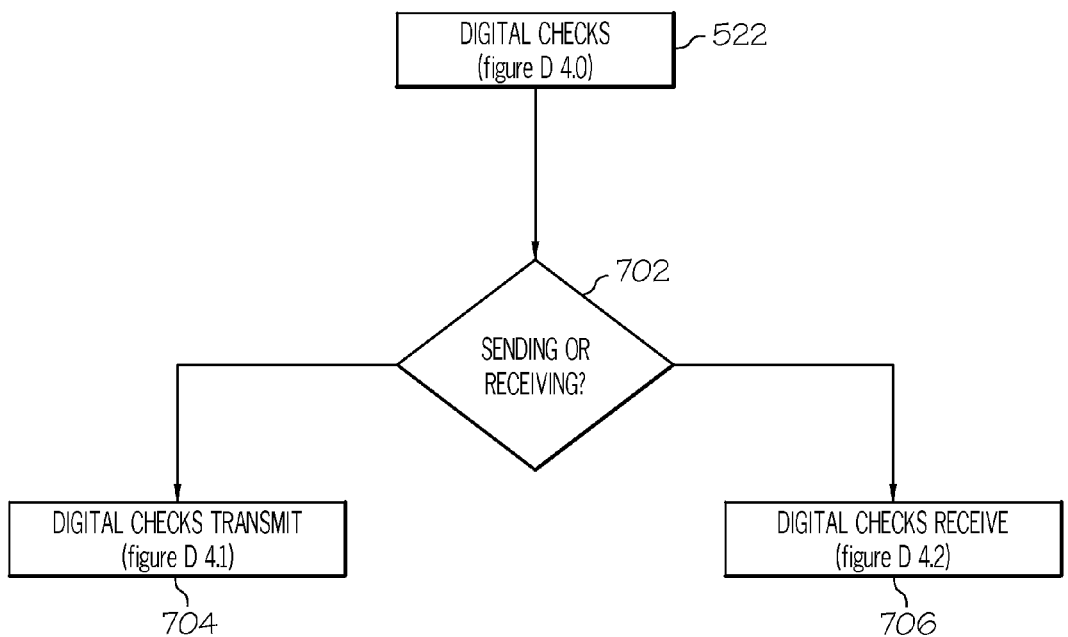
Figure 5L:
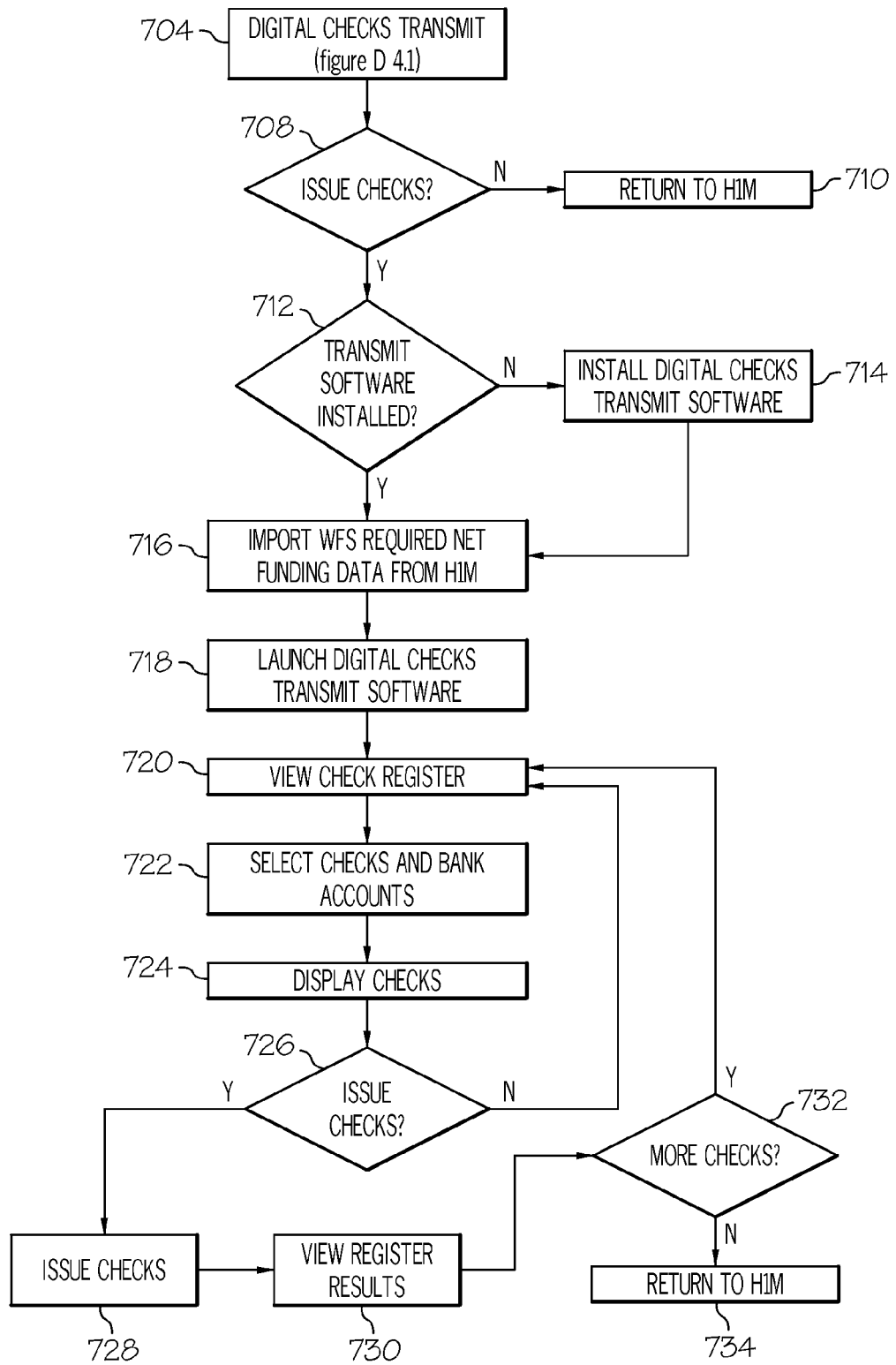
Figure 5M:
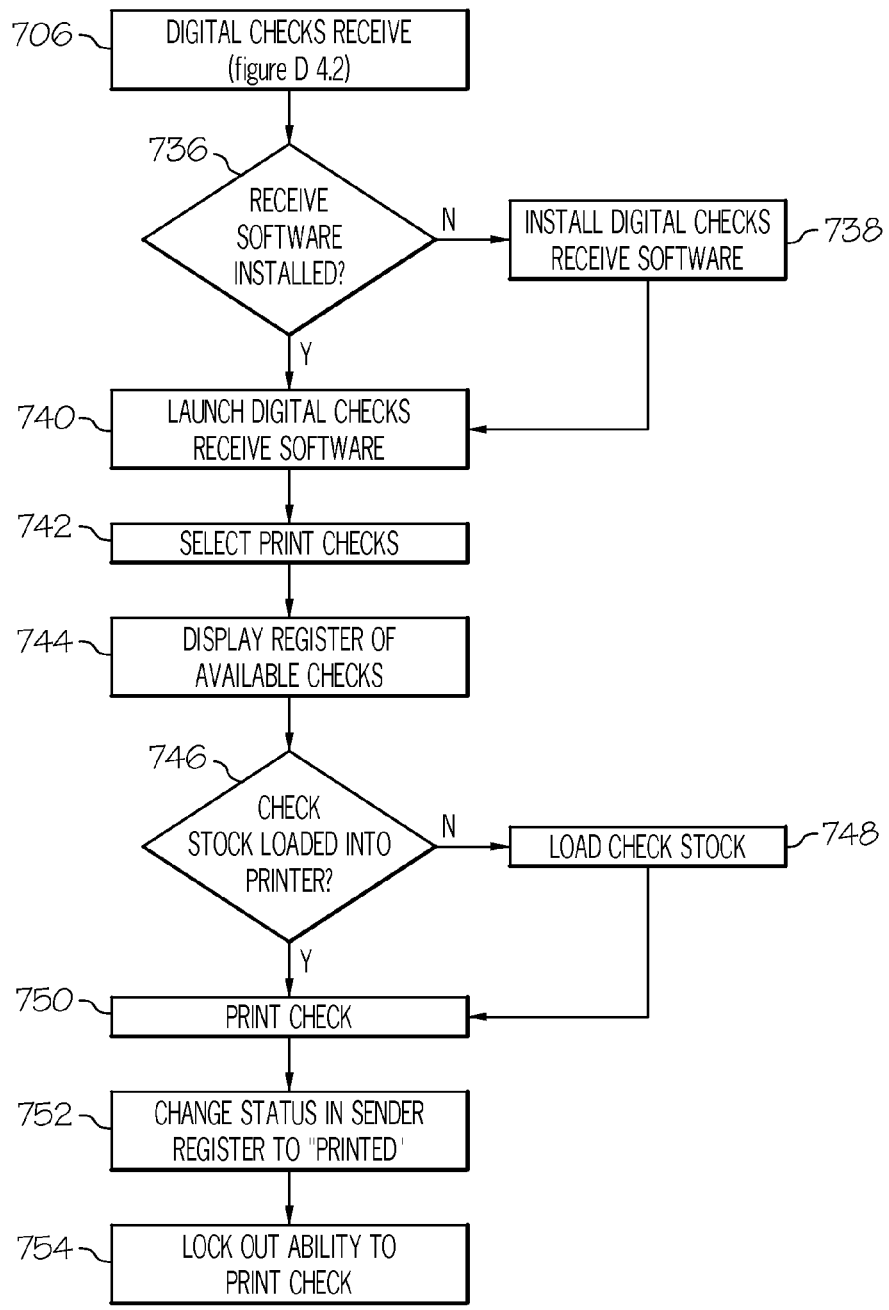
Figure 5N:
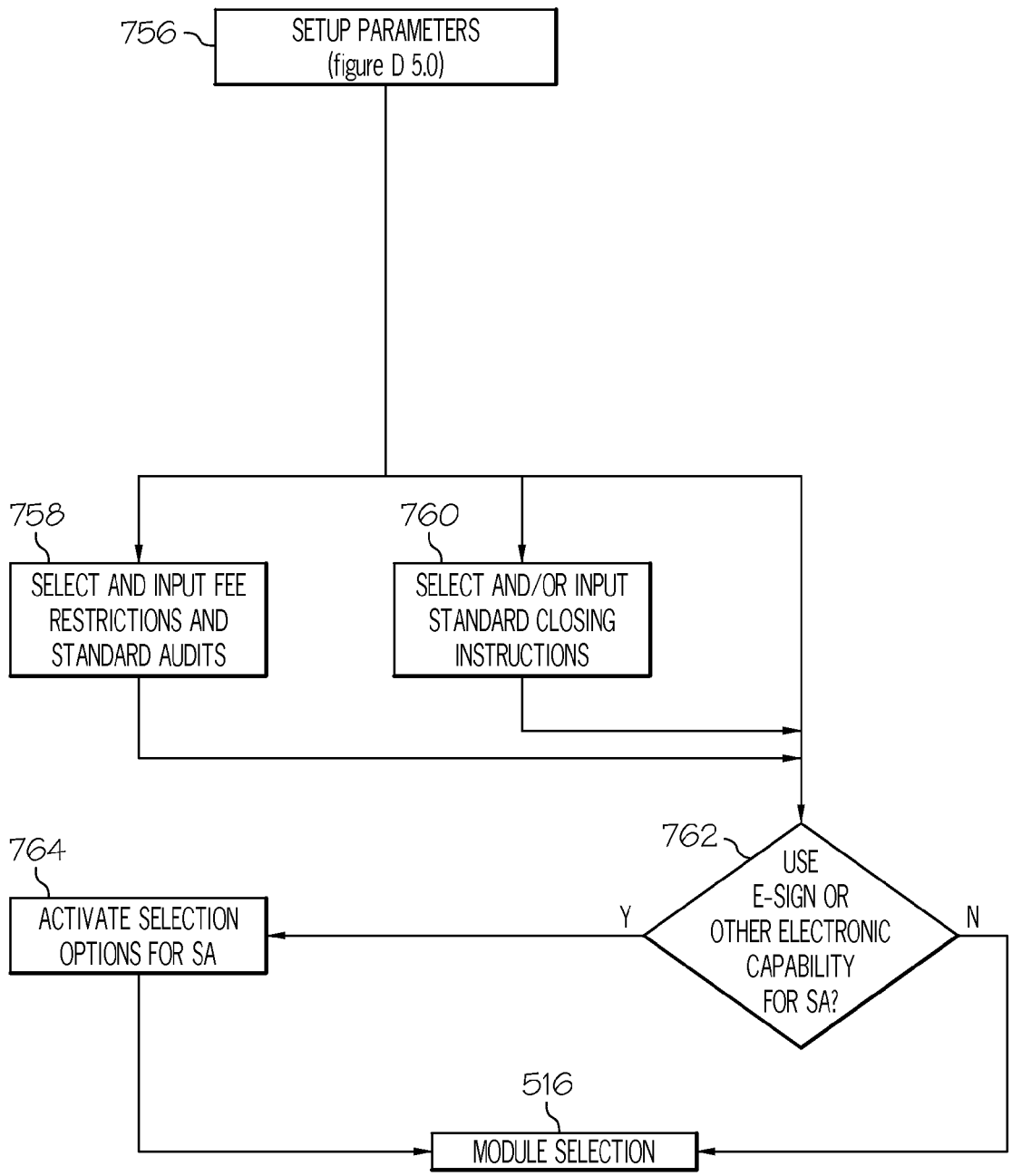

FIGS. 5A-5N show flow diagrams of the processes that can be performed in an electronic computer network for carrying out one embodiment of the present invention. One of ordinary skill in the art would appreciate that other software design approaches could also be used to carry out the processes of the present invention.

FIG. 5A illustrates the System log in process and the initial steps during use of the System. In particular, FIG. 5A illustrates the following steps described below:

Step 500: Entry point to the DINLOG. User arrives at this location as voluntary destination or via links embedded within System generated electronic notice.

Step 502: User asked to identify if previously registered. If Yes, advanced to 508. If No, advanced to 504.

Step 504: User asked to create unique, confidential name, password and select functional contribution (Mortgage Originator, Settlement Agent, or Warehouse Funding Source) for use in future authentication attempts.

Step 508: User required to type in user name and password established at first login session.

Step 510: If third consecutive failed attempt to successfully match new input with originally created user name and password, then advance to 512. If consecutive failed attempts equals less than three, then return to 508.

Step 512: Suspend user ability to enter system and display notice to user of suspension. User also notified that reactivation of authentication requires administrator override and/or administrator resetting of user's username and password.

Step 514: User name and password that is input is compared against originally created user name and password. If correct match is determined, authentication is successful and user advanced to 755. If incorrect match is determined, authentication effort is suspended and user advanced to 510.

Step 755: User may select changes to setup parameters. If user elects to make changes, advance to 756. If user elects not to make changes, advance to 516.

Step 756: User may select changes to setup parameters including, but not necessarily limited to, global instructions to be followed on each transaction. User's ability to make changes is restricted based on functional position determined at login.

Step 516: User prompted to select one of the following modules: HUD-1 Module (518), Digital Audits (520), or Digital Checks (522).

Step 518: User entry into HUD-1 Module

Step 520: User entry into Digital Audits Module.

Step 522: User entry into Digital Checks Module

FIG. 5B illustrates involved in the user accessing and existing loan file or creating a new one. In particular, FIG. 5B illustrates the following steps described below:

Steps 524 and 526: User chooses to work or view existing loan file data already in System or begin creation/importing of new loan file data. If user selects existing loan file data, advance to 538. If user selects new loan file data, advance to 528.

Step 528: User begins creation/importing of new loan file data.

Step 530: User asked if new loan file data is to be imported from outside source, or manually input. If user selects import of file data from outside source, advance to 534. If user selects manual input of loan file data, advance to 532.

Step 532: User manually inputs loan file data required by System.

Step 534: User causes System to convert loan file data into XML format for importing Step 536: Loan file data is imported or manually input. System maintains loan file data in usable format using SQL Tables and XMLU Module.

Step 538: User advanced to General Information Screen of HUD-1 Module.

FIG. 5C illustrates the series of steps that can be performed when a user enters general information into the System. In particular, FIG. 5C comprises the following steps described below:

Step 540: User asked to approve use of loan file data selected. If Yes, advance to 542. If No, return to 538.

Step 542: User prompted to enter or edit name, address, and other identifying information for borrower and any co-borrowers.

Step 544: User asked to review and confirm use of borrower (and co-borrower) identifying information input in 542. If information confirmed for use, advance to 546. If information not confirmed for use, return to 542 for editing.

Step 546: User prompted to enter or edit name, address, and other identifying information for seller.

Step 548: User asked to review and confirm use of seller identifying information input in 546. If information confirmed for use, advance to 550. If information not confirmed for use, return to 546 for editing.

Step 550: User prompted to enter or edit name, address, and other identifying information for payee who will receive proceeds from the subject property transaction upon closing.

Step 552: User asked to review and confirm use of payee identifying information input in 550. If information confirmed for use, advance to 554. If information not confirmed for use, return to 550 for editing.

Step 554: Beginning of data entry/editing routine for 700, 800, 900, 1000, 1100, 1200, 1300 and 1400 series of line items for the HUD-1 settlement statement for the proposed real property transaction.

Step 556: Beginning of data entry/editing routine for 100, 200, 300, 400, 500, and 600 series of line items for the HUD-1 settlement statement for the proposed real property transaction.

FIG. 5D illustrates the steps that can be performed when a user enters series 700-1400 data into a settlement statement according to the present invention. In particular, FIG. 5D comprises the following steps described below:

Step 558: Display the group of line item series currently known by the System to be required for the selected series of line items for the HUD-1 settlement statement.

Step 560: User may choose to stay within the current group of line item series or leave to view another. If user selects to stay within the current group of series, then user may select actions within 564, 566, or 568. If user selects to leave the current series, advance to 556.

Step 564: User begins adding a line item to selected series within HUD-1. Display template for entering of line item information to be added.

Step 566: User may edit line item information within the selected series. User may only edit the amount charged for line items required by regulation. User may add description to line items required by regulation. User may add or delete text descriptions and amounts charged relating to line items which are not required by government regulation (i.e., dynamically grow the data).

Step 568: User may entirely delete line items which are not required to be displayed on HUD-1.

Step 570: User inputs the line item information to be added to the selected series of the HUD-1, including but not limited to line item description, and amount.

Step 572: User asked to review and accept the additional line input in 570. If user accepts additional line item input, return to 558. If user chooses to not accept the additional line items input, return to 570.

Step 574: User is asked to confirm deletion of the selected line item. If user confirms the deletion of the selected line item, advance to 576. If user chooses to not confirm the deletion of the selected line item, return to 558.

Step 576: Remove selected line item and return to 558.

Step 578: Display existing line item information for line item selected for editing.

Step 580: User enters the modified line item information.

Step 582: User is asked to review and accept the modified line item information. If user accepts the modified line item information, advance to 584. If the user chooses to not accept the modified line item information, return to 558.

Step 584: System places the modified line item information as input by user. Return to 558.

FIG. 5E illustrates the series of steps that may be performed when a user enters series 100-600 data into a settlement statement according to the present invention. In particular, FIG. 5E comprises the following steps described below:

Step 588: Display the group of line item series currently known by the System to be required for the selected series of line items for the HUD-1 settlement statement.

Step 590: User may choose to stay within the current group of line item series, or leave to view another. If user selects to stay within the current group of series, then user may select actions within 594, 596, or 598. If user selects to leave the current series, advance to 592.

Step 594: User begins adding a line item to selected series within HUD-1. Display template for entering of line item information to be added.

Step 596: User may edit line item information within the selected series. User may only edit the amount charged for line items required by regulation. User may add description to line items required by regulation. User may add or delete text descriptions and amounts charged relating to line items which are not required by government regulation.

Step 598: User may delete entire line items which are not required to be displayed.

Step 600: User inputs the line item information to be added to the selected series of the HUD-1, including but not limited to line item description and amount.

Step 602: User asked to review and accept the additional line input in 600. If user accepts additional line item input, return to 588. If user chooses to not accept the additional line items input, return to 600.

Step 604: User is asked to confirm deletion of the selected line item. If user confirms the deletion of the selected line item, advance to 606. If user chooses to not confirm the deletion of the selected line item, return to 588.

Step 606: Remove selected line item and return to 588.

Step 608: Display existing line item information for line item selected for editing.

Step 610: User enters the modified line item information.

Step 612: User is asked to review and accept the modified line item information. If user accepts the modified line item information, advance to 614. If the user chooses to not accept the modified line item information, return to 588.

Step 614: System places the modified line item information as input by user. Return to 588.

Step 616: Enter Reports Screen wherein user selects report to be produced by System.

FIG. 5F illustrates the steps that may be performed when a user desires to have the System produce a report in accordance with the present invention. In particular, FIG. 5F comprises the following steps described below:

Step 618: User prompted to select report to be produced by System. If user selects Loan Information Sheet report, advance to 620. If user selects Net Funding Reconciliation report, advance to 622.

Step 620: Display user specified report including but not limited to Loan Information Sheet report Step 622: Display Net Funding Reconciliation report Step 624: User permitted to print copy of displayed report. If user selects to print displayed report, advance to 626. If user selects to not print displayed report, return to 618.

Step 626: System sends the displayed report to the print spool resident on the user's computer.

Step 628: User may elect to send the Net Funding Reconciliation to Warehouse Funding Source via electronic transmission. If user elects to transmit the report to Warehouse Funding Source, advance to 630. If user elects to not transmit the report to Warehouse Funding Source, return to 618.

Step 630: System electronically sends the Net Funding Reconciliation report to Warehouse Funding Source and returns user to 618.

Step 632: Display Audit results report.

FIG. 5G illustrates the steps that may be performed when enabling a user to use the message board in accordance with the present invention. In particular, FIG. 5G comprises the following steps described below:

Step 634: Enter Message Board of HUD-1 Module

Step 636: Display user's unread and archived messages identified with the subject transaction. User may choose to read existing messages, or post a new message relating to the subject transaction addressed to the other authenticated user or users relating to the subject transaction. If user chooses to read existing messages, user selects which message to read and System advances to 640. If user chooses to post a new message, advance to 644.

Step 640: Displays selected message

Step 644: User enters new message relating to the subject transaction for subsequent viewing by the other authenticated user or users relating to the subject transaction.

Step 648: User asked to review and confirm the entered message. If user confirms entered information, advance to 650. If user does not confirm entered information, return to 636.

Step 650: System stores the entered message and notifies addressee of its existence and unread status on message board.

FIG. 5H illustrates the steps that may be performed during the change approval process in accordance with the present invention. In particular, FIG. 5H comprises the following steps described below:

Step 652: Enter Change of Approval section of HUD-1 Module

Step 654: Displays current settlement statement approval status of Mortgage Originator and Settlement Agent. User prompted to choose "In Progress" or "Approved" status for the subject transaction settlement statement. If user selects "In Progress", advance to 656. If user selects "Approved", advance to 658.

Step 656: Display current status of "In Progress", advance to 660

Step 658: Display current status of "Approved", advance to 662

Step 660: User asked to decide on changing status to "Approved" If user chooses to change status to "Approved", advance to 664. If user chooses not to change status, return to 654.

Step 662: User asked to decide on changing status to "In Progress" If user chooses to change status to "In Progress", advance to 668. If user chooses not to change status, return to 654.

Step 664: System changes user's approval status relating to the subject transaction settlement statement to "Approved".

Step 668: System changes user's approval status relating to the subject transaction settlement statement to "In Progress".

FIG. 5I illustrates the steps that may be performed in the audit report section of the System in accordance with the present invention. In particular, FIG. 5I comprises the following steps described below:

Step 670: Enter Audit Report section of System

Step 672: Display audits results for audits performed on the loan file data to date by the System Step 674: User asked to decide if additional audits of loan file data are desired. If user chooses to have additional audits performed, advance to 676. If user chooses to not have additional audits performed, return to 672

Step 676: User selects from menu of additional audits

Step 678: HUD-1 Module calls the Digital Audits Module to perform additional audits selected by user in 676

Step 680: Results of additional audits are sent to audit results display (672).

FIG. 5J illustrates the steps that occur when audits are requested through the System modules in accordance with the present invention. In particular, FIG. 5J comprises the following steps described below:

Step 682: System determines if audits are being requested through System modules other than within Digital Audits Module. If audits are being requested by other System modules, advance to 686. If audits are being requested by user within the Digital Audits Module, advance to 684.

Step 684: User selects from menu the audits to be performed on loan file data.

Step 686: Loan file data and audit array selections from other System module imported into Digital Audits Module.

Step 688: User asked to confirm existence of loan file data in Digital Audits Module. If user confirms that loan file data exists within the Digital Audits Module, advance to 692. If user does not confirm that loan file data exists within Digital Audits Module, advance to 690.

Step 690: User causes import of loan file data into Digital Audits Module.

Step 692: User asked to confirm start of audits to be performed on loan file data. If user confirms start, advance to 696. If user does not confirm start, advance to 694.

Step 694: System terminates audit activity on subject loan file data and returns user to 518

Step 696: System determines if audit arrays selected by user require use of external database or vendors. If external databases or vendors are required, advance to 700. if external databases or vendors are not required, advance to 698.

Step 698: Digital Audits Module performs audits and/or comparisons as directed on the subject loan file data.

Step 700: Digital Audits Module electronically links to the external databases and/vendors required to perform requested audits.

FIG. 5K illustrates the steps that occur when a user chooses to send or receive an electronic check in accordance with the present invention. In particular, FIG. 5K comprises the following steps described below:

Step 702: User can choose to send or receive an electronic check. If user chooses to send, advance to 704. If user chooses to receive, advance to 706.

Step 704: Enter Digital Checks Module Send process.

Step 706: Enter Digital Checks Module Receive process.

FIG. 5L illustrates the steps that occur when a user desires to transmit a digital check in accordance with the present invention. In particular, FIG. 5L comprises the following steps described below:

Step 708: User asked to confirm desired action of issuing digital checks. If user confirms desire to issuing digital checks, advance to 712. If user does not confirm desire to issue digital checks, advance to 710.

Step 710: Return user to 518.

Step 712: User asked to confirm that Send software has been installed on user's computer. If user confirms that Send software is installed, advance to 716. If user does not confirm that Send software is installed on user's computer, advance to 714.

Step 714: User prompted to install Send software on user's computer.

Step 716: User prompted to import the Net Funding Data from HUD-1 Module.

Step 718: User prompted to launch Digital Checks Module Send software program.

Step 720: Display the user's digital check register.

Step 722: User is required to select check recipient and bank accounts for use in the digital check sending process.

Step 724: Display digital check for user review.

Step 726: User is required to approve or reject the displayed digital check for issuance. If the user approves the displayed digital check, advance to 728. If the user rejects the issuance of the displayed digital check, return to 720.

Step 728: Send software program causes check to be uploaded and stored in a secure server. The securely stored digital check is only accessible by the check's payee using the Digital Checks Module receive software process beginning at 706.

Step 730: Display check register for user review. Check register displays the check information and payee's retrieval status.

Step 732: User may choose to send additional checks. If user chooses to send additional checks, return to 720. If user chooses not to send additional checks, advance to 734

Step 734: Return user to 518.

FIG. 5M illustrates the steps that may occur when a user desires to receive a digital check in accordance with the present invention. In particular, FIG. 5M comprises the following steps described below:

Step 736: User asked to confirm that Receive software has been installed on user's computer. If user confirms that Receive software is installed, advance to 740. If user does not confirm that Receive software is installed on user's computer, advance to 738.

Step 738: User prompted to install Receive software on user's computer.

Step 740: User prompted to launch Digital Checks Module receive [Receive?] software program.

Step 742: User selects "print checks" from display screen.

Step 744: Display of receiver's available digital checks is shown on user's computer screen. User prompted to select the digital check or checks from the display screen.

Step 746: User asked to confirm that appropriate check stock is properly installed and readied in user's selected printer. If user confirms that check stock is readied, advance to 750. If user does not confirm that check stock is readied, advance to 748.

Step 748: User required to load appropriate check stock into printer to be used to print digital check.

Step 750: User selects "print check" from display screen. Digital Checks Module Receive software send digital check print file to print spool on user's computer.

Step 752: Digital Checks Module changes the retrieval status of the check(s) printed in 750 to "printed." This change in retrieval status is reflected on the check register that is viewable by sender of the check(s) printed in 750.

Step 754: Digital Checks Module locks out all ability to print again the check(s) printed in 750.

FIG. 5N illustrates the steps that may occur when a user desires to make changes to certain setup parameters, and when a user desires to activate electronic identity capability, in accordance with the present invention. In particular, 5N comprises the following steps described below:

Step 758: User selects and/or inputs fee restrictions and standard audit arrays to be performed by system modules.

Step 760: User selects and/or inputs closing instructions which will be typical for each transaction.

Step 762: User must choose to activate E-sign and/or other electronic identity affidavit capability activation for Settlement Agent. If user chooses activation, advance to 764. If user chooses no activation, advance to 516.

Step 764: Activate E-sign and/or other electronic identity affidavit capability for Settlement Agent as determined in 764.

VI. User Screens

Figure 6A:
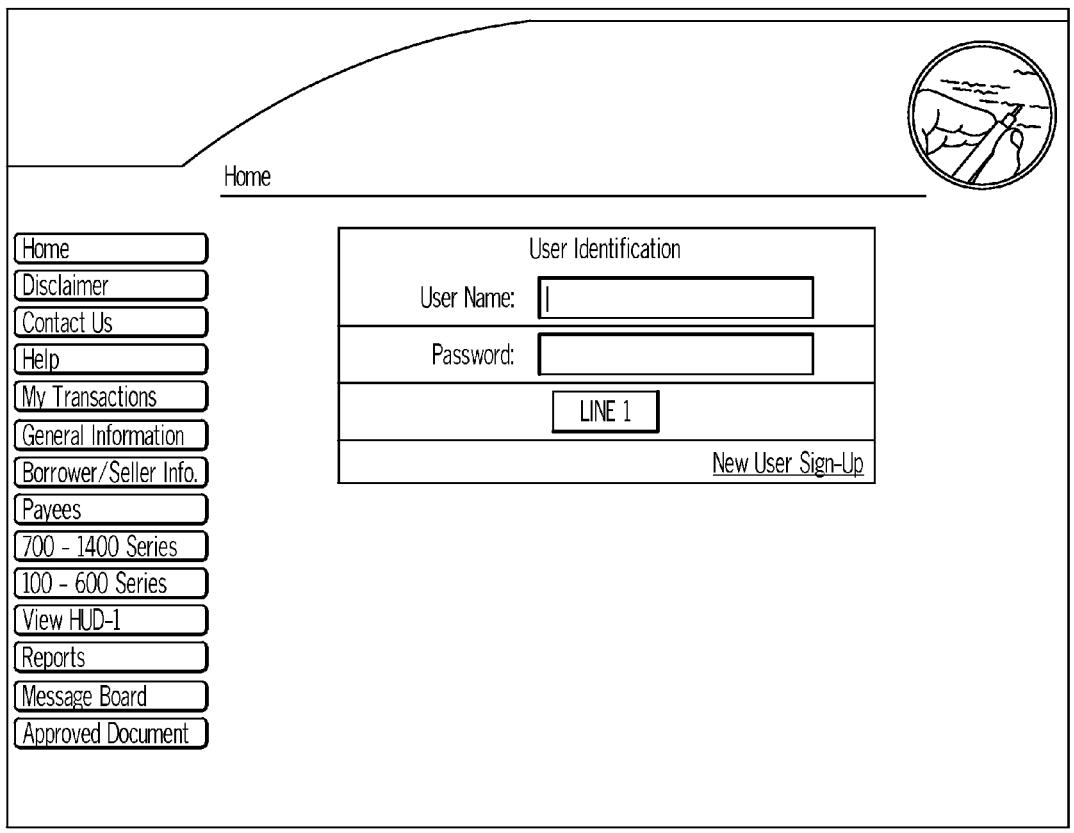

FIGS. 6A-6Z, FIGS. 7-9, FIGS. 10A-10C, and FIG. 11 illustrate examples of screens that may be displayed, through a graphical user interface, to users of the System in carrying out the processes of one embodiment of the present invention. The user display illustrated in each figure is described in more detail below:

FIG. 6A—Home. This is the login screen, where users are required to enter their user name and password before entering the System. Once they click the "Submit" button, their user name and password is authenticated through SQL server. If correct, the user is let into the System and bought to the "My Transactions" screen.

Figure 6B:
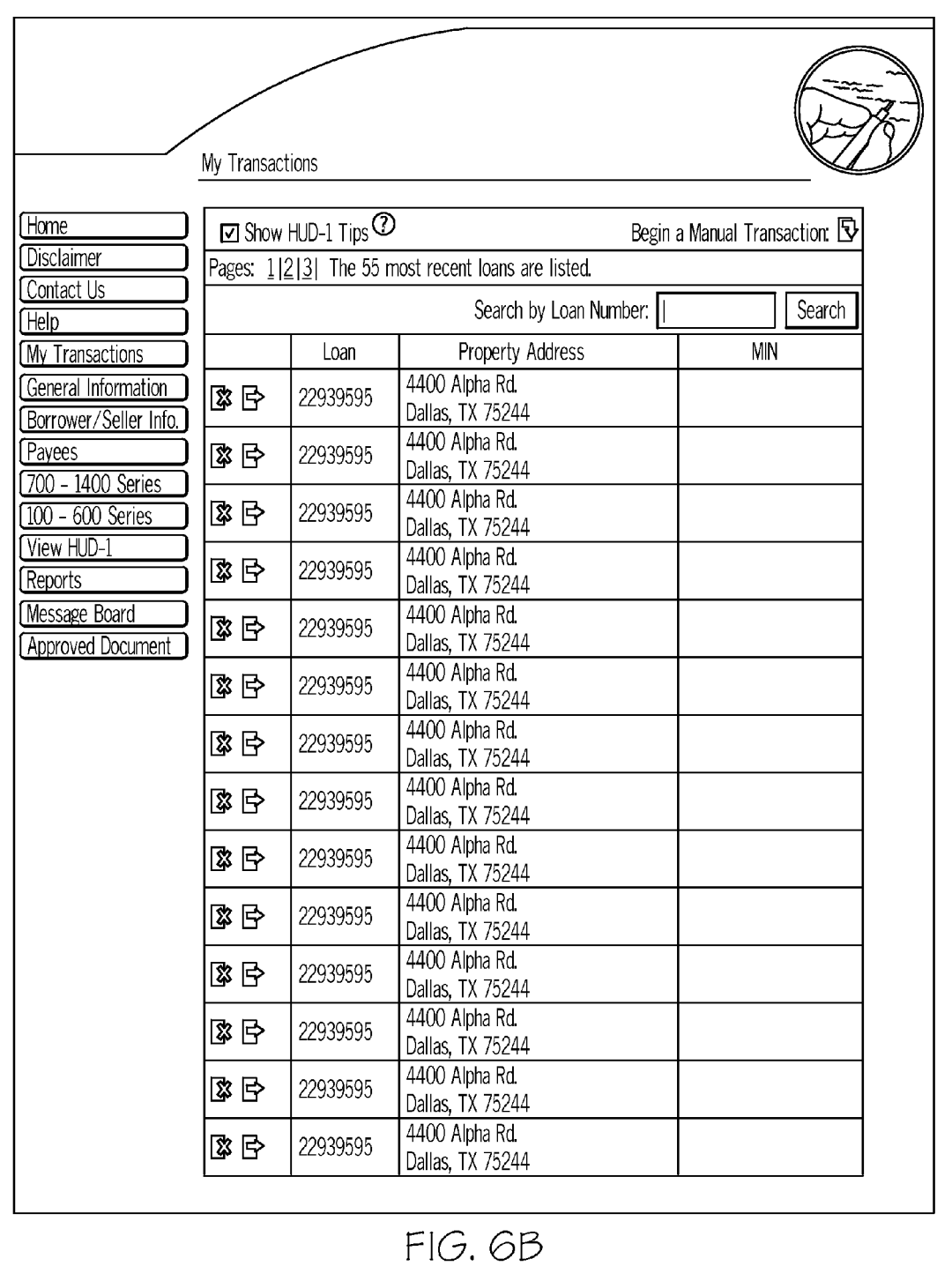

FIG. 6B—My Transactions. Here the user will see their seventy-five most recent transactions with fifteen transactions listed per page. Transactions can be deleted by clicking the red "X." It is important to note, however, that these transactions are only removed from the "My Transactions" page, they are not removed from the database. To enter a given transaction, the user can click on the green arrow found next to the loan number. A search feature is also available, where the loan number can be entered. If the loan was found, and the user has access to this transaction, the user is sent to the "General Information" screen.

FIG. 6C—General Information. This is the first data entry screen for a loan. The information asked on this screen includes Type of Loan, Loan Number, GF Number, Lender Information, Property Information, and Settlement Agent Information. Once all required fields have been entered, the user can move on to the next screen, "Borrower/Seller Information."

Figure 6D:

FIG. 6D—Borrower/Seller Information. This screen displays all borrowers and sellers that have been assigned to this loan. From here, borrowers and sellers can be added, edited, and deleted. By clicking the "Edit" button, the user will be brought to the details screen for that particular borrower or seller.

Figure 6E:

FIG. 6E—Edit Borrower Information. Here the user will enter or edit all of the information for a particular borrower. The green arrow next to the Address field can be clicked to auto-populate the Property Address into the borrower Address fields. Once all information is provided, clicking "Submit" will send the user back to the "Borrower/Seller Information" screen.

Figure 6F:

FIG. 6F—Edit Seller Information. Much like the "Edit Borrower Information" screen, seller name and address can be filled out here. Again, the green arrow can be clicked to auto-populate the seller's address to be the Property Address. Clicking "Submit" will save the data and send the user back to the "Borrower/Seller Information" screen.

Figure 6G:

FIG. 6G—Payees. This screen displays all of those payees assigned to this transaction. From here, the user has the option to add, edit, and delete payees. This list of payees is then used to populate a drop-down list of payees when entering specific line item information. Clicking the "Edit" button will take the user to the "Edit Payee Information" screen for that particular payee.

Figure 6H:
Figure 61:

FIG. 6H—Edit Payee Information. All detailed payee information is entered here, such as company name, address, primary contact, phone number, and fax number. This additional payee information is needed upon the disbursement of funds. Clicking "Submit" will send the user back to the "Payees" screen.

FIG. 6I—100 Series. This screen displays all line items that appear in the 100 Series, "Gross Amount Due From Borrower." From here, the user can add, edit, and delete line items. However, those line items without a red "X" are static fields and cannot be deleted. This ensures that the resulting HUD-1 document will be RESPA compliant.

Legal Description: "Section 100 summarizes the borrower's costs, such as the contract cost of the house, any personal property being purchased, and the total settlement charges owed by the borrower from Section L."

Figure 6J:

FIG. 6J—200 Series. This screen displays all line items that appear in the 200 Series, "Amounts Paid By or In Behalf of Borrower."

Legal Description: "Section 200 lists the amount paid by the borrower or on behalf of the borrower. This will include the deposit of earnest money the borrower put down with the agreement of sale, the loan(s) the borrower are getting and any loan the borrower may be assuming."

Figure 6K:

FIG. 6K—300 Series. This screen displays all line items that appear in the 300 Series, "Cash at Settlement From/To Borrower."

Legal Description: "Section 300 reflects the difference between the gross amount due from the borrower and the total amount paid by/for the borrower. Generally, line 303 will show the amount of cash the borrower must bring to settlement."

Figure 6L:

FIG. 6L—400 Series. This screen displays all line items that appear in the 400 Series, "Gross Amount Due to Seller."

Figure 6M:

FIG. 6M—500 Series. This screen displays all line items that appear in the 500 Series, "Reduction in Amount Due to Seller."

Figure 6N:
Figure 60:

FIG. 6N—600 Series. This screen displays all line items that appear in the 600 Series, "Cash at Settlement To/From Seller."

FIG. 6O—700 Series. This screen displays all line items that appear in the 700 Series, "Total Sales/Brokers Commission."

Figure 6P:

FIG. 6P—800 Series. This screen displays all line items that appear in the 800 Series, "Items Payable in Connection with Loan."

Legal Description: "These are the fees that lenders charge to process, approve and make the mortgage loan."

Figure 6Q:

FIG. 6Q—900 Series. This screen displays all line items that appear in the 900 Series, "Items Required by the Lender to be Paid in Advance."

Legal Description: "Items Required by Lender to Be Paid in Advance: The borrower may be required to prepay certain items at the time of settlement, such as accrued interest, mortgage insurance premiums and hazard insurance premiums. Lines 901-905. This series is used to record the items which the lender requires (but which are not necessarily paid to the lender, i.e., FHA mortgage insurance premium) to be paid at the time of settlement, other than reserves collected by the lender and recorded in 1000 series."

Figure 6R:

FIG. 6R—1000 Series. This screen displays all line items that appear in the 1000 Series, "Reserves Deposited with Lender."

Legal Description: "Lines 1000-1008. This series is used for amounts collected by the lender from the borrower and held in an account for the future payment of the obligations listed as they fall due. Include the time period (number of months) and the monthly assessment. In many jurisdictions this is referred to as an 'escrow', 'impound', or 'trust' account. In addition to the items listed, some lenders may require reserves for flood insurance.

Escrow Account Deposits: These lines identify the payment of taxes and/or insurance and other items that must be made at settlement to set up an escrow account. The lender is not allowed to collect more than a certain amount. The individual item deposits may overstate the amount that can be collected. The aggregate adjustment makes the correction in the amount on line 1008. It will be zero or a negative amount. The escrow account payments may include a 'cushion' or an extra amount to ensure that the lender has enough money to make the payments when due. RESPA limits the amount of the cushion to a maximum of two months of escrow payments."

Figure 6S:

FIG. 6S—1100 Series. This screen displays all line items that appear in the 1100 Series, "Title Charges."

Legal Description: "Lines 1100-1113. This series covers title charges and charges by attorneys. The title charges include a variety of services performed by title companies or others and includes fees directly related to the transfer of title (title examination, title search, document preparation and fees and for title insurance. The legal charges include fees for lender's, seller's or buyer's attorney, or the attorney preparing title work. The series also includes any fees for settlement or closing agents and notaries. In many jurisdictions the same person (for example, an attorney or a title insurance company) performs several of the services listed in this series and makes a single overall charge for such services. In such cases, enter the overall fee on line 1107 (for attorneys), or line 1108 (for title companies), and enter on that line the item numbers of the services listed which are covered in the overall fee. If this is done, no individual amounts need be entered into the borrower's and seller's columns for the individual items which are covered by the overall fee. In transactions involving more than one attorney, one attorney's fees should appear on Line 1107 and the other attorney's fees should be on line 1111, 1112 or 1113. If an attorney is representing a buyer, seller, or lender and is also acting as a title agent, indicate on line 1107 which services are covered by the attorney fee and on line 1113 which services are covered by the insurance commission."

Figure 6T:

FIG. 6T—Series 1200. This screen displays all line items that appear in the 1200 Series, "Government Recording and Transfer Charges."

Legal Description: "Government Recording and Transfer Charges: These fees may be paid by the borrower or by the seller, depending upon the borrower's agreement of sale with the seller. The buyer usually pays the fees for legally recording the new deed and mortgage (line 1201). Transfer taxes, which in some localities are collected whenever property changes hands or a mortgage loan is made, can be quite large and are set by state and/or local governments. City, county and/or state tax stamps may have to be purchased as well (lines 1202 and 1203)."

Figure 6U:

FIG. 6U—1300 Series. This screen displays all line items that appear in the 1300 Series, "Additional Settlement Charges."

Legal Description: "Lines 1301 and 1302, or any other available blank line in the 1300 series, are used for fees for survey, pest inspection, radon inspection, lead-based paint inspection, or other similar inspections."

Figure 6V:

FIG. 6V—1400 Series. This screen displays line 1400, "Total Settlement Charges." This is the total of all line items found on Page 2 of the HUD. This is a calculated field and cannot be edited directly.

Legal Description: "Line 1400 is for the total settlement charges paid from borrower's funds and seller's funds. These totals are also entered on lines 103 and 502, respectively, in sections J and K."

Figure 6W:
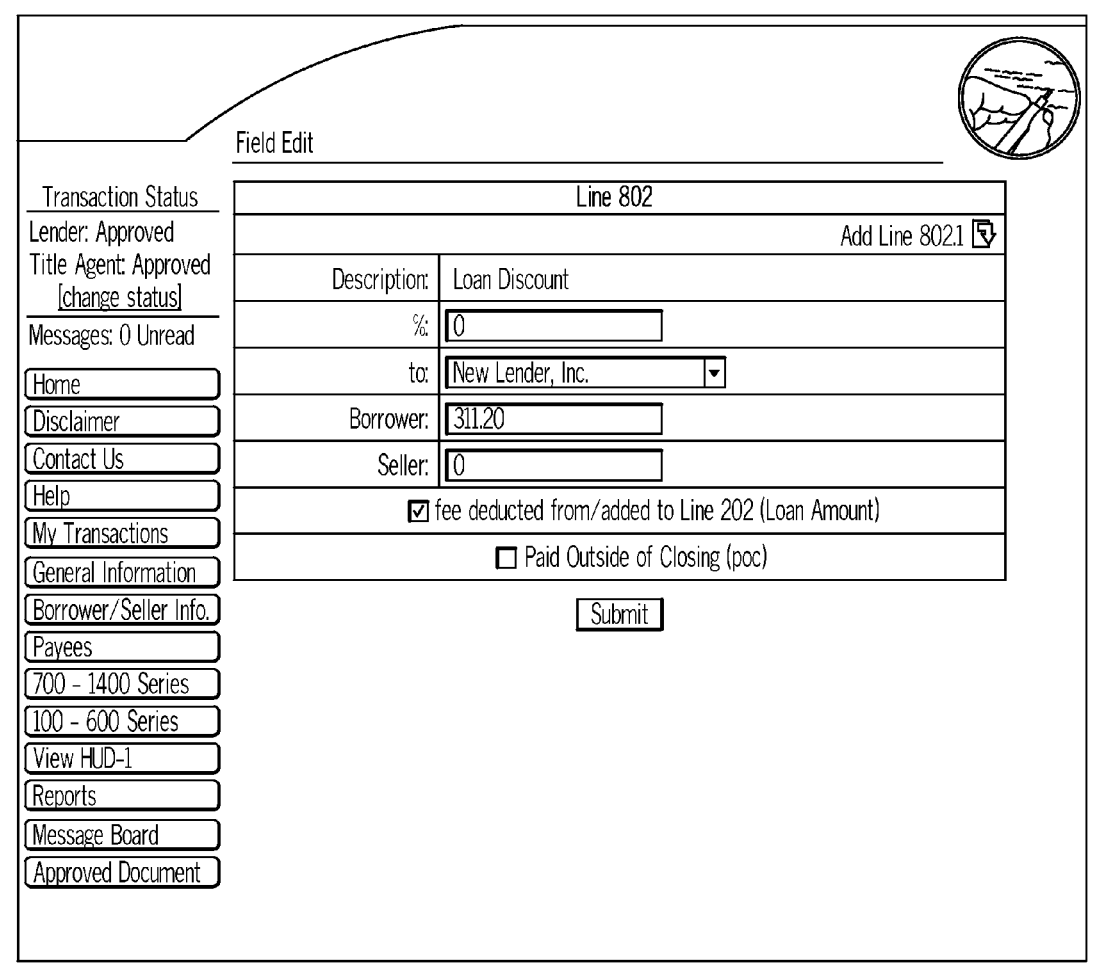

FIG. 6W—Edit Line Item. Here the user can enter the specific information for the particular line item. The payee drop-down list is populated from the "Payees" screen. "Fee deducted from/added to line 202 (Loan Amount)" can be checked if this fee is to show up on the "Net Funding Reconciliation" screen. If a fee is Paid Outside of Closing ("poc"), this checkbox can be checked and the poc "Paid By" and poc "Amount" must then be provided.

In the event of a split fee, the user can add an additional line item, such as "801.1" or "801.2." This will take the user to another "Edit Line Item" screen, but for the newly added line item.

Figure 6X:

FIG. 6X—Add New Line Item. From the Series view screens, when the user clicks, "Add New Field," they are taken to this screen. Much like the "Edit Line Item" screen, the user enters all line specific information and can choose if this fee will show up on the "Net Funding Reconciliation" screen. This screen is used for those additional fees that are not static line items, or those line items regulated by RESPA.

Figure 6Y:

FIG. 6Y—Message Board. Here both parties of the transaction, Mortgage Originator and Settlement Agent, can communicate on the given transaction. If a message has not been read, the envelope is closed. When read, the envelope is open. This can be used to see if the other party has read a particular message. A timestamp is also posted with every message to provide further accountability. A message can be read by clicking on subject text. At the bottom of the screen, the user can post a new message. Clicking "Send" will post the message such that all parties immediately see it in their Inbox.

Figure 6Z:

FIG. 6Z—View Message. Once the user has clicked on the subject of the message on the "Message Board" screen, he or she is brought to this screen. The body of the message is displayed along with the time/date posted and who posted it. When the "Back" button is clicked, the user is sent back to the Message Board. The envelope next to the message just viewed will now be opened and the message will then be listed under the "Archives" section of the "Message Board" screen.

Figure 7:
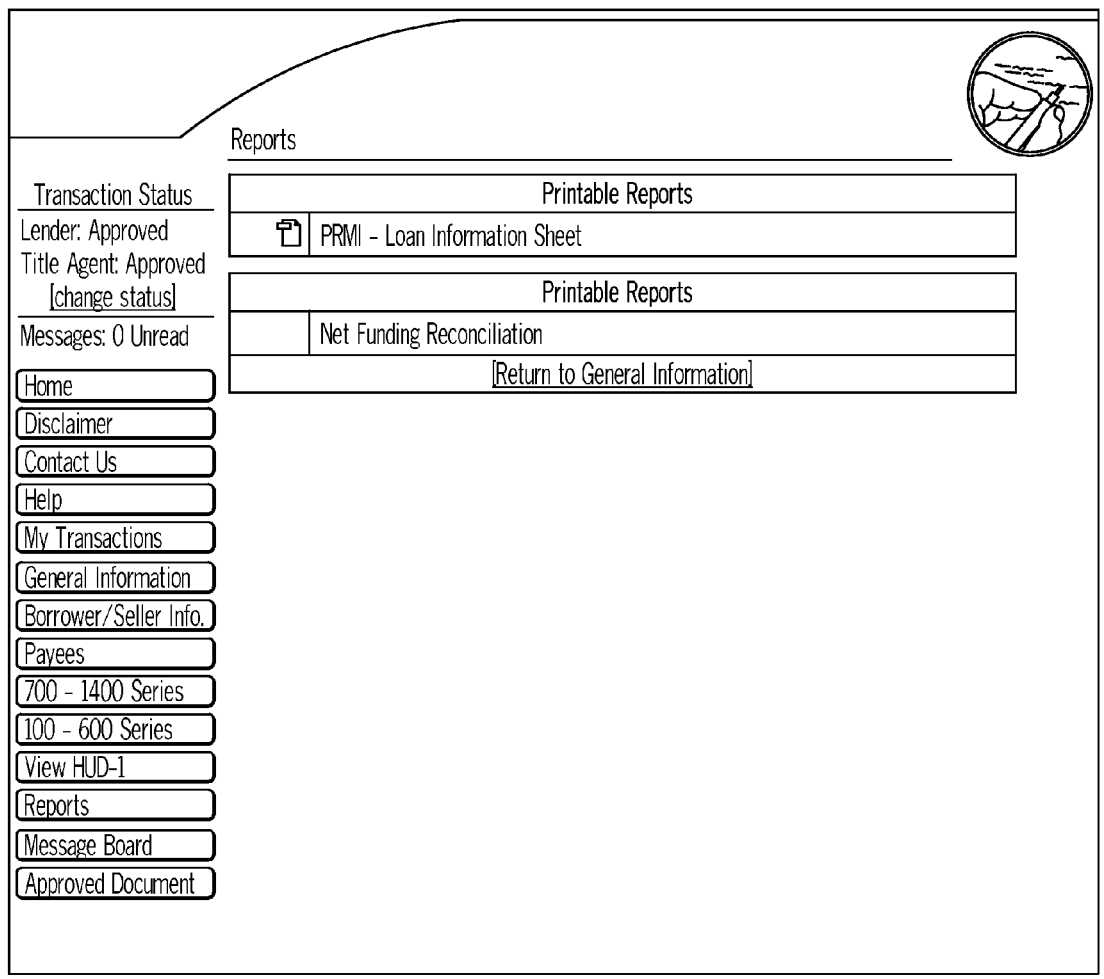

FIG. 7—Reports. From here the user can navigate to the "Loan Information Sheet" or the "Net Funding Reconciliation" screen. Any additional reports, such as Lender specific reports, can be added to this screen.

FIG. 8—Loan Information Sheet. This is a printable report that includes information such as loan number, payoff loan number, title clearance issues, state required documents, loan amount, borrower information, property address, and any special instructions needed for the loan. All of this information is pulled from the "General Information" screen. Clicking "Back" will send the user back to the "Reports" screen.

FIG. 9—Net Funding Reconciliation. This is essentially the funding request to be sent to the Warehouse Funding Source. This includes a breakdown of each line item that goes into the Net Funding Total. This Net Funding Total is the deducted from the Loan Amount to achieve the final, "Net Funding Amount." Below, the user can enter Fund Remittance information, such as "Remit Funds To" (Settlement Agent, Funding Coordinator, Broker, Other) and "Fund By" (Cashier's Check, Corporate Check, Digital Check, Wire Transfer). Once completed, this document can be Emailed by filling in the recipients' Email address(es) and clicking, "Send."

Figure 10A:
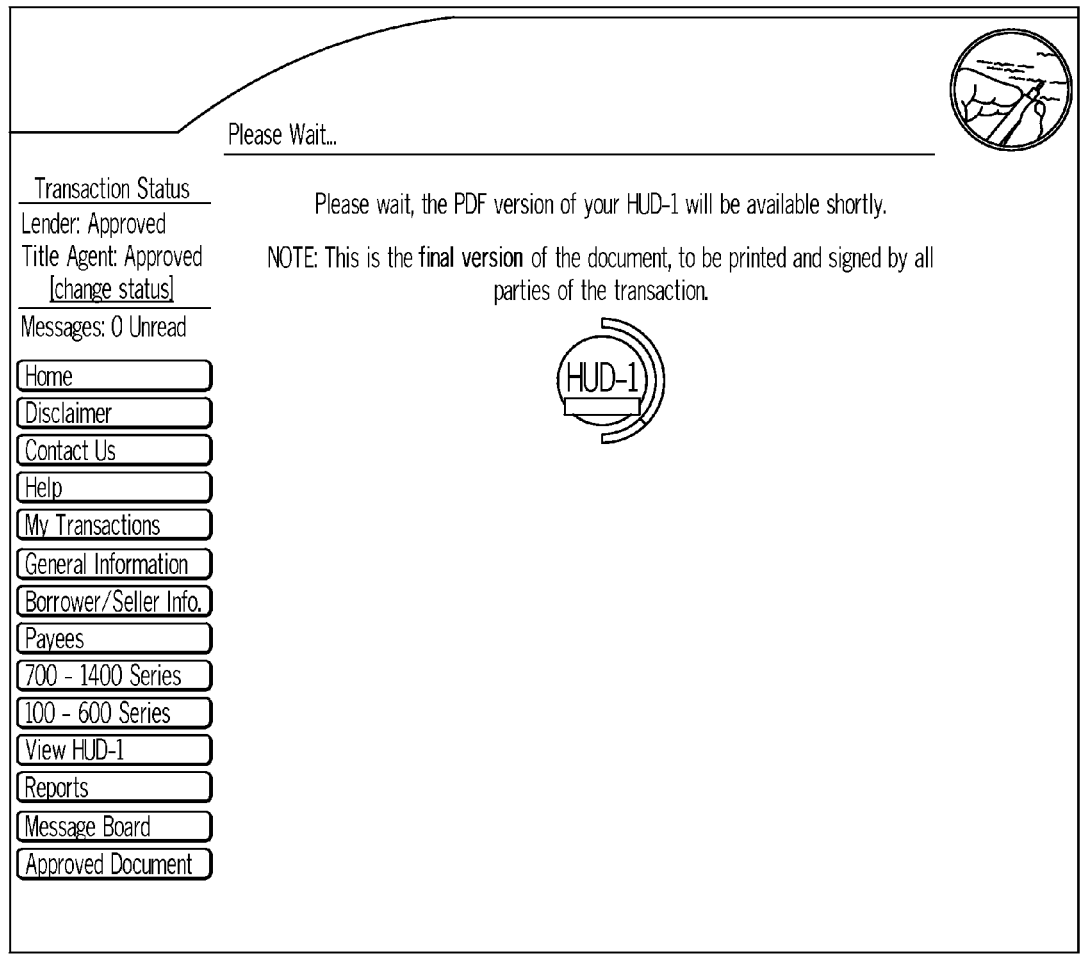

FIG. 10A—Please Wait. This screen is displayed during the generation of the final PDF version of the HUD-1.

Figure 10B:
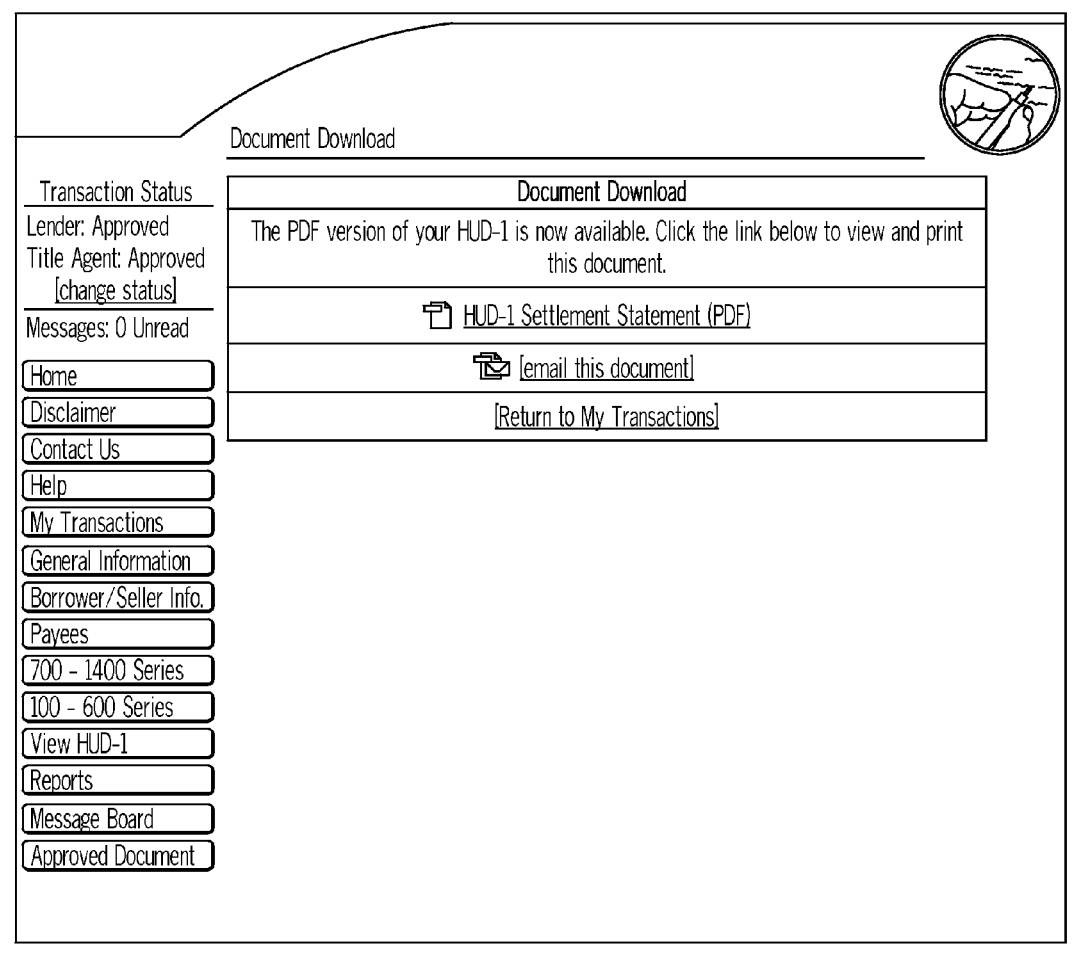

FIG. 10B—Document Download. Once the document has been generated, the user will be brought to this screen, from the "Please Wait" screen. The first link takes them to the PDF version of the HUD-1. Below, the user can go to the "Email HUD-1 Document" screen, where the HUD Document can be attached to an Email and sent to the desired recipient.

Figure 10C:

FIG. 10C—Email HUD-1 Document. The user enters the recipients' Email address(es) and any additional information they wish to provide in the body of the Email. Upon clicking, "Send" the PDF version of the HUD will be attached to the Email and sent to all recipients.

Figure 11:
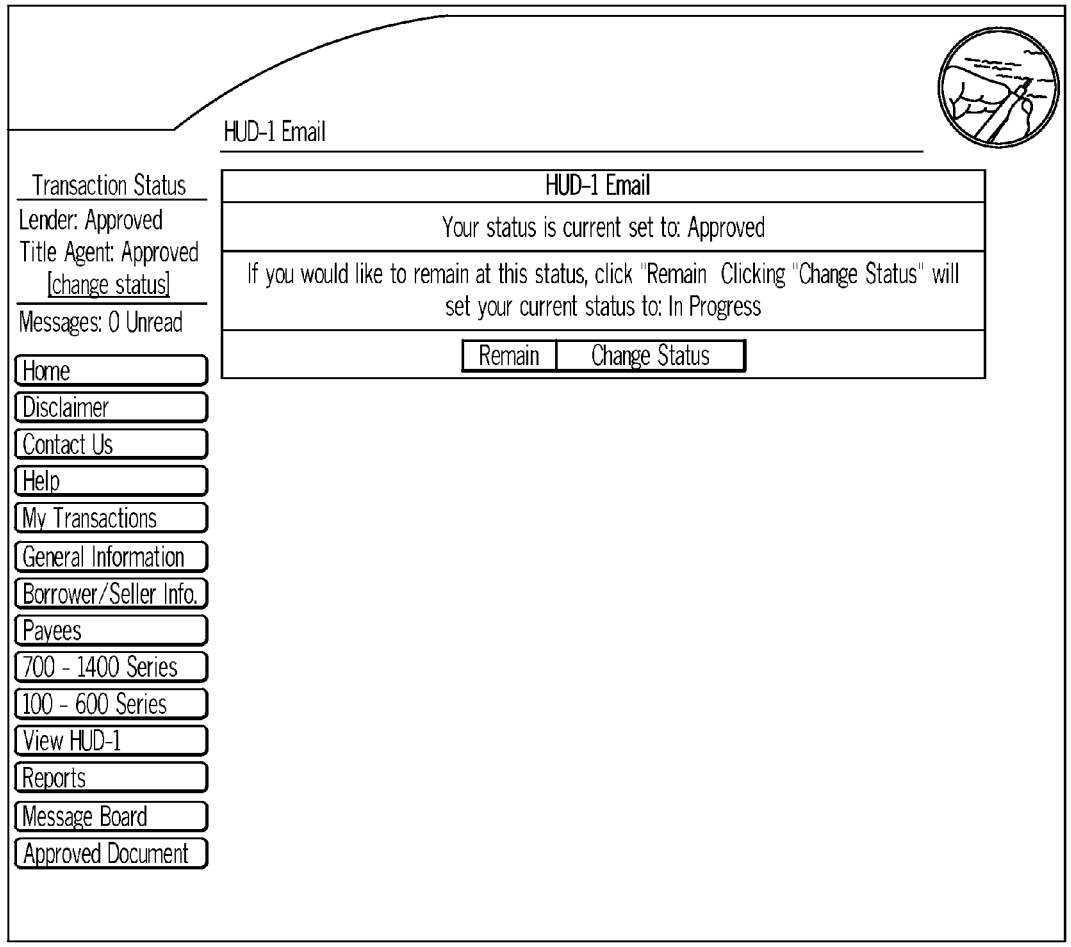

FIG. 11—Transaction Status. In order to print the final PDF version of the HUD, both parties much approve the transaction. The transaction status of a given loan is always visible in the top left corner of the screen. Clicking "Change Status" will redirect to this screen. Clicking "Change Status" will either take the user from "In Progress" to "Approved" or from "Approved" to "In Progress." Also, if a particular party has not yet been assigned to a transaction, their status will appear as "Unassigned."

An example of a final HUD-1 Settlement Statement, that can be generated in PDF format, is illustrated in FIG. 12. Saving the HUD-1 in PDF format prevents any last minute changes or editing of fees without first going back into the system and having both parties approve the transaction and generate a new HUD-1.

VII. Other Embodiments

The System is capable of incorporating substantial customization of many features and functions, including, but not limited to the following;

1) Mortgage Originator fees and descriptions
2) Mortgage Originator fee amount and input limitations
3) Settlement Agent fees and descriptions
4) Settlement Agent fee amount and input limitations
5) Screen appearance to the user or group of users
6) Audits and/or comparison of file data All customization templates are stored in SQL Tables in secure data storage.

Preferred implementations of the invention include implementations as a computer system programmed to execute the process or processes described herein, and as a computer program product.

Figure 13:
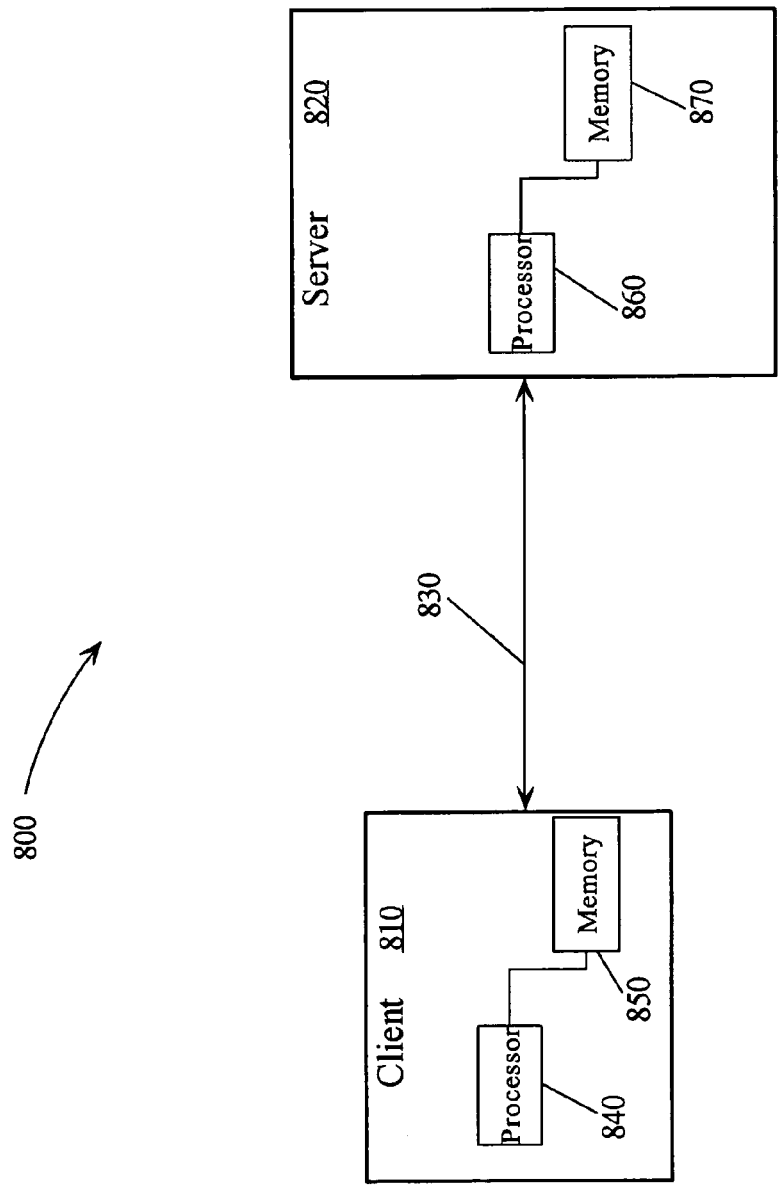
FIG. 13 is an example of a computer networked environment wherein an embodiment of the present invention may be employed.

FIG. 13 shows a networked data processing environment 800 where the invention can be used. The data processing environment 800 is an arrangement of one or more client computers 810 and server computers 820 (generally "hosts") connected to each other by a network 830, for example, the Internet. Users access information and interface with network 830 and server computer 820 through a client computer 810.

Client computer 810 can be utilized as part of an e-commerce system on an information network such as the Internet. Client computer 810 includes a processor 840 that executes one or more computer program products stored in memory 850. Similarly, server computer 820 includes a processor 860 that executes one or more computer program products stored in memory 870. Client computer 810 and server computer 820 may be individually programmed to collectively execute the process or processes of the invention described herein.

Those skilled in the art will appreciate that embodiments disclosed herein may be implemented as software program instructions capable of being distributed as one or more program products, in a variety of forms, including computer program products which may be executed by processor 840 of client computer 810 and/or processor 860 of server computer 820, and that the present invention applies equally regardless of the particular type of program storage media or signal bearing media used to actually carry out the distribution. Examples of program storage media and signal bearing media include recordable type media such as floppy disks, CD-ROM, and magnetic tape transmission type media such as digital and analog communications links, as well as other media storage and distribution systems.

Additionally, the foregoing detailed description has set forth various embodiments of the present invention via the use of block diagrams, flowcharts, and/or examples. It will be understood by those skilled within the art that each block diagram component, flowchart step, and operations and/or components illustrated by the use of examples can be implemented, individually and/or collectively, by a wide range of hardware, software, firmware, or any combination thereof. The present invention may be implemented as those skilled in the art will recognize, in whole or in part, in standard Integrated Circuits, Application Specific Integrated Circuits (ASICs), as a computer program running on a general-purpose machine having appropriate hardware, such as one or more computers, as firmware, or as virtually any combination thereof and that designing the circuitry and/or writing the code for the software or firmware would be well within the skill of one of ordinary skill in the art, in view of this disclosure.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A method of managing the closing of a real property transaction using a networked computer system, wherein the computer system includes one or more client computers, a server computer, and a network which interfaces the one or more client computers and the server computer, the method comprising:

accessing through a lender, one or more computer program products on the server computer from one of the one or more client computers, to manage the closing of a real property transaction;

entering, through the lender only, a first group of data into a settlement statement used in a real property transaction;

accessing through a settlement agent, the one or more computer program products on the server computer from one of the one or more client computers;

entering, through the settlement agent only, a second group of data into the settlement statement;

authorizing by the lender through a lender computer the second group of data entered by the settlement agent;

auditing the settlement statement both prior to and after funding;

auditing custom-selected loan files as directed by the lender via a first module of the one or more computer program products to ensure compliance with government regulations and warehouse funding source requirements, wherein the first module consolidates its custom audit results finds with mandatory audits for viewing by users of the one or more computer program products, wherein the custom audits comprise:

determining if a subject loan has been assigned a registration identification number and accuracy thereof;

performing the mandatory audits by a second module of the one or more computer program products on each file, wherein the mandatory audits comprise:

comparing a borrower name against a database;

comparing a zip code of a collateral property with a zip code database;

determining if any new disclosure documents are needed in order to have a compliant closing by auditing the first group of data; and positively match a title insurance company to an identity provided by the settlement agent to assure a valid insured closing service letter; and wherein the real property transaction will be presented for funding and the settlement statement will be presented for signature only if the lender authorizes the second group of data entered into the settlement statement by the settlement agent.

2. The method of claim 1, wherein the first group of data is entered manually or through importing.

3. The method of claim 1, further comprising the step of notifying the lender and the settlement agent of progress in the real property transaction and any changes in the settlement statement.

4. The method of claim 1, further comprising the step of auditing data entered by the lender or the settlement agent.

5. The method of claim 1, wherein if the real property transaction is to be funded, further comprising the step of comparing an amount of funds requested on the settlement statement with any amounts of funds to be received or disbursed, and noting any discrepancies in the amounts.

6. The method of claim 1, further comprising the steps of:

accessing through one of a warehouse funding source and an investor, the one or more computer program products on the server computer from one of the one or more client computers;

receiving confirmation, through one of the warehouse funding source and investor, that the lender authorizes the data entered into the settlement statement or authorizes funding of the real property transaction; and funding, through one of the warehouse funding source and investor, the real property transaction if one of the warehouse funding source and investor receives said confirmation.

7. The method of claim 6, wherein if said confirmation is received, the funding is transmitted electronically using a send computer program product on one of the one or more client computers, accessed by one of the warehouse funding source and investor, and a receive computer program product on a second of the one or more client computers, accessed by the settlement agent.

8. The method of claim 6, further comprising the steps of:
placing, through one of the warehouse funding source and investor, conditions on the funding that the settlement agent must satisfy; and
rejecting, through one of the warehouse funding source and investor, the funding if the conditions are not satisfied.

9. The method of claim 6 further comprising the step of:
auditing, after funding, the settlement statement versus the amount funded.

10. The method of claim 1, wherein the lender and the settlement agent can respectively dynamically grow the first and second groups of data while the data is entered into the settlement statement.

11. The method of claim 7, wherein one of the warehouse funding source and investor and the settlement agent are automatically notified of a change in status of the funding.

12. A method of managing the closing of a real property transaction using a networked computer system, wherein the computer system includes one or more client computers, a server computer, and a network which interfaces the one or more client computers and the server computer, the method comprising:
accessing through a lender, one or more computer program products on the server computer from one of the one or more client computers, to manage the closing of a real property transaction;
entering, through the lender only, a first group of data into a settlement statement used in a real property transaction, wherein the lender can dynamically grow the first group of data while the data is entered into the settlement statement;
accessing through a settlement agent, the one or more computer program products on the server computer from one of the one or more client computers;
entering, through the settlement agent only, a second group of data into the settlement statement, wherein the settlement agent can dynamically grow the second group of data while the data is entered into the settlement statement;
authorizing by the lender through a lender computer the second group of data entered by the settlement agent;
accessing through one of a warehouse funding source and an investor, the one or more computer program products on the server computer from one of the one or more client computers;
receiving confirmation, through one of the warehouse funding source and investor, that the lender authorizes said data entered into the settlement statement or authorizes funding of the real property transaction; and
electronically funding, through one of the warehouse funding source and investor, the real property transaction if one of the warehouse funding source and investor receives said confirmation;
auditing the settlement statement both prior to and after funding;
verifying via a first module of the one or more computer program products to ensure compliance with government mandates or regulations and warehouse funding source requirements, wherein the first module consolidates its custom audit results finds with mandatory audits for viewing by users of the one or more computer program products, wherein the custom audits comprise:
determining if a subject loan has been assigned a registration identification number and accuracy thereof;
performing the mandatory audits by a second module of the one or more computer program products on each file, wherein the mandatory audits comprise:
comparing a borrower name against a database;
comparing a zip code of a collateral property with a zip code database;
determining if any new disclosure documents are needed in order to have a compliant closing by auditing the first group of data; and
positively match a title insurance company to an identity provided by the settlement agent.

13. The method of claim 12, further comprising the step of auditing data entered by the lender or the settlement agent.

14. The method of claim 12, wherein if said confirmation is received, the funding is transmitted electronically using a send computer program product on one of the one or more client computers, accessed by one of the warehouse funding source and investor, and a receive computer program product on a second of the one or more client computers, accessed by the settlement agent.

15. The method of claim 12, further comprising the steps of:
placing, through one of the warehouse funding source and investor, conditions on the funding that the settlement agent must satisfy; and
rejecting, through one of the warehouse funding source and investor, the funding if the conditions are not satisfied.

16. The method of claim 12 further comprising the step of:
auditing, after funding, the settlement statement versus the amount funded.

17. A system for managing the closing of a real property transaction using a networked computer system, comprising:
a server computer including one or more computer program products for managing the closing of a real property transaction;
a first client computer, which interfaces with the server computer through a network, for accessing the one or more program products on the server computer to enable a lender only to enter a first group of data into a settlement statement used in a real property transaction;
a second client computer, which interfaces with the server computer through a network, for accessing the one or more computer program products on the server computer to enable a settlement agent only to enter a second group of data into the settlement statement;
the one or more computer program products including means for the lender to authorize the second group of data entered by the settlement agent; and
wherein the real property transaction will be presented for funding and the settlement statement will be presented for signature only if the lender authorizes the second group of data entered into the settlement statement by the settlement agent;
wherein the one or more computer program products include means for auditing the settlement statement both prior to and after funding;
wherein the one or more computer program products include a first module for auditing custom-selected loan files as directed by the lender to ensure compliance with government regulations and warehouse funding source requirements, wherein the first module consolidates its custom audit results finds with mandatory audits for viewing by users of the one or more computer program products, wherein the custom audits comprise:

determining if a subject loan has been assigned a registration identification number and accuracy thereof;

wherein the one or more computer program products include a second module for performing the mandatory audits on each file, wherein the mandatory audits comprise:

comparing a borrower name against a database;

comparing a zip code of a collateral property with a zip code database;

determining if any new disclosure documents are needed in order to have a compliant closing by auditing the first group of data; and positively match a title insurance company to an identity provided by the settlement agent.

18. The system of claim 17, wherein the lender enters the first group of data manually or through importing.

19. The system of claim 17, further comprising:

a third client computer, which interfaces with the server computer through a network, for accessing the one or more computer program products on the server computer to enable one of a warehouse funding source and investor only to receive confirmation that the lender authorizes the data entered into the settlement statement or authorizes funding of the real property transaction; and means for electronically funding, through the third client computer, the real property transaction if one of the warehouse funding source and investor receives said confirmation.

20. The method of claim 19, further comprising:

a send computer program product on the third client computer;

a receive computer program product on the second client computer; and wherein if said confirmation is received, the funding can be transmitted electronically using the send computer program product on the third client computer and a receive computer program product on the second client computer.

21. The system of claim 17, wherein the lender and the settlement agent can respectively dynamically grow the first and second groups of data while the data is entered into the settlement statement.

22. One or more program storage media readable by a machine and containing instructions for performing the method contained in claim 1.

23. One or more program storage media readable by a machine and containing instructions for performing the method contained in claim 12.

* * * * *